(12) United States Patent
Nagarajan

(10) Patent No.: US 11,914,547 B2
(45) Date of Patent: Feb. 27, 2024

(54) SILICON PHOTONICS BASED MODULE FOR EXECUTING PEER-TO-PEER TRANSACTIONS

(71) Applicant: Marvell Asia Pte Ltd., Singapore (SG)

(72) Inventor: Radhakrishnan L. Nagarajan, Santa Clara, CA (US)

(73) Assignee: MARVELL ASIA PTE LTD, Singapore (SG)

( * ) Notice: Subject to any disclaimer, the term of this patent is extended or adjusted under 35 U.S.C. 154(b) by 0 days.

(21) Appl. No.: 17/866,973

(22) Filed: Jul. 18, 2022

(65) Prior Publication Data
US 2022/0358080 A1 Nov. 10, 2022

Related U.S. Application Data

(63) Continuation of application No. 16/912,535, filed on Jun. 25, 2020, now Pat. No. 11,392,534, which is a
(Continued)

(51) Int. Cl.
*G06F 15/78* (2006.01)
*G06F 13/42* (2006.01)
(Continued)

(52) U.S. Cl.
CPC ..... *G06F 15/7817* (2013.01); *G02B 6/12004* (2013.01); *G06F 13/364* (2013.01);
(Continued)

(58) Field of Classification Search
CPC ........... G02B 2006/12121; G02B 2006/12123; G02B 2006/12143; G06F 13/364; G06F 13/4072; G06F 13/42; G06F 13/4282; G06F 15/7817; H04L 1/0003; H04L 25/03006; H04L 25/03343; H04L 27/0008;
(Continued)

(56) References Cited

U.S. PATENT DOCUMENTS 9,547,622 B1 1/2017 Nagarajan et al.
9,846,674 B2 12/2017 Nagarajan et al.
(Continued)

OTHER PUBLICATIONS

U.S. Appl. No. 17/751,212, filed May 23, 2022, Radhakrishnan Nagarajan.

*Primary Examiner* — Stephen J Clawson

(57) ABSTRACT

An optical module configured to control a peer to peer transaction includes a silicon photonics substrate, memory formed on the silicon photonics substrate and configured to store a private key, application circuitry formed on the silicon photonics substrate and coupled to the memory, the application circuitry configured to receive, via an external interface, an electrical signal carrying instructions for executing a transaction, verify the transaction using the private key stored in the memory, and selectively generate a transaction message including information for completing the transaction, and optical communication circuitry formed on the silicon photonics substrate and responsive to the application circuitry, the optical communication circuitry configured to generate an optical signal based on the transaction message and transmit the optical signal to at least one remote entity.

14 Claims, 16 Drawing Sheets

Related U.S. Application Data continuation of application No. 16/196,614, filed on Nov. 20, 2018, now Pat. No. 10,733,138, which is a continuation-in-part of application No. 15/810,641, filed on Nov. 13, 2017, now Pat. No. 10,248,616, which is a continuation of application No. 15/408,280, filed on Jan. 17, 2017, now Pat. No. 9,846,674, which is a continuation of application No. 14/311,004, filed on Jun. 20, 2014, now Pat. No. 9,547,622.

(60) Provisional application No. 61/845,325, filed on Jul. 11, 2013, provisional application No. 61/842,337, filed on Jul. 2, 2013.

(51) Int. Cl.

| | | |
|---|---|---|
| *H04L 27/00* | (2006.01) | |
| *G02B 6/12* | (2006.01) | |
| *H04L 1/00* | (2006.01) | |
| *H04L 25/03* | (2006.01) | |
| *G06F 13/40* | (2006.01) | |
| *G06F 13/364* | (2006.01) | |
| *H04L 27/02* | (2006.01) | |
| *H04L 5/14* | (2006.01) | |
| *H04L 27/18* | (2006.01) | |
| *H04L 27/34* | (2006.01) | |

(52) U.S. Cl.
CPC .......... *G06F 13/4072* (2013.01); *G06F 13/42* (2013.01); *G06F 13/4282* (2013.01); *H04L 1/0003* (2013.01); *H04L 25/03006* (2013.01); *H04L 27/0008* (2013.01); *G02B 2006/12061* (2013.01); *G02B 2006/12097* (2013.01); *G02B 2006/12121* (2013.01); *G02B 2006/12123* (2013.01); *G02B 2006/12142* (2013.01); *H04L 5/14* (2013.01); *H04L 25/03343* (2013.01); *H04L 27/02* (2013.01); *H04L 27/18* (2013.01); *H04L 27/34* (2013.01)

(58) Field of Classification Search
CPC ......... H04L 27/02; H04L 27/18; H04L 27/34; H04L 5/14
See application file for complete search history.

(56) References Cited

U.S. PATENT DOCUMENTS

| | | |
|---|---|---|
| 10,055,375 B2 | 8/2018 | Sheth et al. |
| 10,120,825 B2 | 11/2018 | Sheth et al. |
| 10,120,826 B2 | 11/2018 | Sheth et al. |
| 10,154,031 B1 | 12/2018 | Lerner |
| 10,248,616 B2 | 4/2019 | Nagarajan et al. |
| 10,289,595 B2 | 5/2019 | Sheth et al. |
| 10,409,758 B1 | 9/2019 | Sheth et al. |
| 10,417,176 B2 | 9/2019 | Nagarajan et al. |
| 10,607,211 B2 | 3/2020 | Schroeder |
| 10,649,951 B2 | 5/2020 | Nagarajan et al. |
| 10,733,138 B2 | 8/2020 | Nagarajan |
| 10,853,886 B1* | 12/2020 | Honeycutt ............. G06Q 40/12 |
| 10,860,525 B2 | 12/2020 | Nagarajan et al. |
| 2002/0091648 A1* | 7/2002 | Phillips ................ G07D 11/009 705/64 |
| 2002/0107781 A1 | 8/2002 | Neyman et al. |
| 2008/0013738 A1* | 1/2008 | Tajima .................. H04L 9/0852 380/278 |
| 2010/0021166 A1 | 1/2010 | Way |
| 2010/0196013 A1* | 8/2010 | Franklin .............. H04B 10/505 398/115 |
| 2011/0267676 A1 | 11/2011 | Dallesasse et al. |
| 2015/0063495 A1* | 3/2015 | Qu ........................ H04L 25/067 375/330 |
| 2015/0178840 A1 | 6/2015 | Chen et al. |
| 2015/0262139 A1 | 9/2015 | Shtylman |
| 2015/0280832 A1* | 10/2015 | Fujikata ................ G02F 1/0123 398/25 |
| 2016/0156999 A1* | 6/2016 | Liboiron-Ladouceur ................... H04Q 11/0005 398/51 |
| 2017/0109735 A1* | 4/2017 | Sheng ................ G06Q 20/3678 |
| 2018/0025442 A1* | 1/2018 | Isaacson ............. H04L 63/0861 705/26.62 |
| 2018/0041280 A1* | 2/2018 | Elahmadi ........... H04B 10/2569 |

* cited by examiner

SILICON PHOTONICS BASED MODULE FOR EXECUTING PEER-TO-PEER TRANSACTIONS

CROSS-REFERENCE TO RELATED APPLICATIONS

This application is a continuation of and claim priority to U.S. application Ser. No. 16/912,535, filed Jun. 25, 2020, which is a continuation of U.S. application Ser. No. 16/196,614, filed Nov. 20, 2018, now U.S. Pat. No. 10,733,138 issued Aug. 4, 2020, which is a continuation-in-part of and claim priority to U.S. application Ser. No. 15/810,641, filed Nov. 13, 2017, now U.S. Pat. No. 10,248,616, issued Apr. 2, 2019, which is a continuation of and claim priority to U.S. application Ser. No. 15/408,280, filed Jan. 17, 2017, now U.S. Pat. No. 9,846,674, issued Dec. 19, 2017, which is a continuation of and claims priority to U.S. application Ser. No. 14/311,004, filed Jun. 20, 2014, now U.S. Pat. No. 9,547,622, issued Jan. 17, 2017, which claims the priority benefit of U.S. Provisional Application No. 61/845,325, filed Jul. 11, 2013 and U.S. Provisional Application No. 61/842,337, filed Jul. 2, 2013, commonly assigned and incorporated by reference herein for all purposes.

BACKGROUND OF THE INVENTION

The present invention relates to telecommunication techniques. More particularly, the present invention provides a single-chip control module or device for an integrated system-on-a-chip configured in communication network and methods thereof.

Over the last few decades, the use of communication networks exploded. In the early days Internet, popular applications were limited to emails, bulletin board, and mostly informational and text-based web page surfing, and the amount of data transferred was usually relatively small. Today, Internet and mobile applications demand a huge amount of bandwidth for transferring photo, video, music, and other multimedia files. For example, a social network like Facebook processes more than 500 TB of data daily. With such high demands on data and data transfer, existing data communication systems need to be improved to address these needs.

Over the past, there have been many types of communication systems and methods. Unfortunately, they have been inadequate for various applications. Therefore, improved methods and systems for optimizing optical communication devices are desired. In particular, a system for storing cryptocurrency wallet and application data securely in the optical layer and a method for communicating the application data through a peer to peer transaction via optical interface are disclosed.

BRIEF SUMMARY OF THE INVENTION

The present invention relates to telecommunication techniques. More specifically, various embodiments of the present invention provide a communication interface that is configured to transfer data at high bandwidth over optical communication networks. In certain embodiments, the communication interface is used by various devices, such as spine switches and leaf switches, within a spine-leaf network architecture, which allows large amount of data to be shared among servers. Additionally, a system and method using the Silicon Photonics based optical module for storing cryptocurrency and implementing secure communications for peer-to-peer transactions over optical networks are disclosed.

In modern electrical interconnect systems, high-speed serial links have replaced parallel data buses, and serial link speed is rapidly increasing due to the evolution of CMOS technology. Internet bandwidth doubles almost every two years following Moore's Law. But Moore's Law is coming to an end in the next decade. Standard CMOS silicon transistors will stop scaling around 5 nm. And the internet bandwidth increasing due to process scaling will plateau. But Internet and mobile applications continuously demand a huge amount of bandwidth for transferring photo, video, music, and other multimedia files. This disclosure describes techniques and methods to improve the communication bandwidth beyond Moore's law.

Serial link performance is limited by the channel electrical bandwidth and the electronic components. In order to resolve the inter-symbol interference (ISI) problems caused by bandwidth limitations, we need to bring all electrical components as close as possible to reduce the distance or channel length among them. Stacking chips into so-called 3-D ICs promises a one-time boost in their capabilities, but it's very expensive. Another way to achieve this goal in this disclosure is to use multiple chip module technology.

In an example, an alternative method to increase the bandwidth is to move the optical devices close to electrical device. Silicon photonics is an important technology for moving optics closer to silicon. In this patent application, we will disclose a high speed electrical optics multiple chip module device to achieve terabits per second speed, as well as variations thereof.

In an alternative example, the present invention includes an integrated system-on chip-device. The device is configured on a single silicon substrate member. The device has a data input/output interface provided on the silicon substrate member and configured for a predefined data rate and protocol. The device has an input/output block provided on the silicon substrate member and coupled to the data input/output interface. In an example, the input/output block comprises a Serializer/Deserializer (SerDes) block, a clock data recovery (CDR) block, a compensation block, and an equalizer block, among others. The device has a signal processing block provided on the silicon substrate member and coupled to the input/output block. In an example, the signal processing block is configured to the input/output block using a bi-direction bus in an intermediary protocol. The device has a driver module provided on the silicon substrate member and coupled to the signal processing block. In an example, the driver module is coupled to the signal processing blocking using a uni-directional multi-lane bus. In an example, the device has a driver interface provided on the silicon substrate member and coupled to the driver module and configured to be coupled to a silicon photonics device. In an example, the driver interface is configured to transmit output data in either an amplitude modulation format or a combination of phase/amplitude modulation format or a phase modulation format. In an example, the device has a receiver module comprising a transimpedance amplifier (TIA) block provided on the silicon substrate member and to be coupled to the silicon photonics device using predefined modulation format, and configured to couple to the digital signal processing block to communicate information to the input output block for transmission through the data input/output interface. In an example, the device has a communication block provided on the silicon substrate member and operably coupled to the input/output block, the digital signal processing block, the driver module, and the receiver module, among others. The device has a communication interface coupled to the communication block. The device has a control block provided on the silicon substrate member and coupled to the communication block.

In an example, the signal processing block comprises a forward error correction (FEC) block, a digital signal processing block, a framing block, a protocol block, and a redundancy block, among others. The driver module is selected from a current drive or a voltage driver in an example. In an example, the driver module is a differential driver or the like. In an example, the silicon photonics device is selected from an electro absorption modulator (EAM) or electro optic modulator (EOM), or a Mach-Zehnder modulator (MZM). In an example, the amplified modulation format is selected from non-return to zero (NRZ) format or pulse amplitude modulation (PAM) format. In an example, the phase modulation format is selected from binary phase shift keying (BPSK) or nPSK. In an example, the phase/amplitude modulation is quad amplitude modulation (QAM). In an example, the silicon photonic device is configured to convert the output data into an output transport data in a wave division multiplexed (WDM) signal. In an example, the control block is configured to initiate a laser bias or a modulator bias. In an example, the control block is configured for laser bias and power control of the silicon photonics device. In an example, the control block is configured with a thermal tuning or carrier tuning device each of which is configured on the silicon photonics device. In an example, the SerDes block is configured to convert a first data stream of N into a second data stream of M.

In an example, the invention provides an integrated system-on-chip device. The device has a single silicon substrate member and a data input/output interface provided on the substrate member and configured for a predefined data rate and protocol. In an example, the device has an input/output block provided on the silicon substrate member and coupled to the data input/output interface. The input/output block comprises a SerDes block, a CDR block, a compensation block, and an equalizer block, among others. The device has a signal processing block provided on the substrate member and coupled to the input/output block. In an example, the signal processing block is configured to the input/output block using a bi-direction bus in an intermediary protocol. In an example, the device has a driver module provided on the substrate member and coupled to the signal processing block. The driver module is coupled to the signal processing blocking using a uni-directional multi-lane bus. In an example, the device has a driver interface provided on the substrate member and coupled to the driver module and configured to be coupled to a silicon photonics device. The driver interface is configured to transmit output data in either an amplitude modulation format or a combination of phase/amplitude modulation format or a phase modulation format in an example. The device has a receiver module comprising a TIA block provided on the substrate member and to be coupled to the silicon photonics device using predefined modulation format, and configured to the digital signal processing block to communicate information to the input output block for transmission through the data input/output interface. In an example, the device has a communication block provided on the substrate member and operably coupled to the input/output block and the digital signal processing block, the driver block, and the receiver block, and others, although there may be variations. In an example, the device has a communication interface coupled to the communication block and a control block provided on the substrate member and coupled to the communication block. In an example, the control block is configured to receive and send instruction(s) in a digital format to the communication block and being configured to receive and send signals in an analog format to communicate with the silicon photonics device.

In an example, the present invention provides a monolithically integrated system-on-chip device configured for a multi-rate and selected format of data communication. In an example, the device has a single silicon substrate member. The device has a data input/output interface provided on the substrate member and configured for a predefined data rate and protocol. In an example, the data input/output interface is configured for number of lanes numbered from four to one hundred and fifty. The device has an input/output block provided on the substrate member and coupled to the data input/output interface, which has a SerDes block, a CDR block, a compensation block, and an equalizer block. In an example, the SerDes block is configured to convert a first data stream of N into a second data stream of M. In an example, each of the first data stream has a first predefined data rate at a first clock rate and each of the second data stream having a second predefined data rate at a second clock rate. As used herein the terms "first" and "second" do not necessarily imply order and shall be construed broadly according to ordinary meaning. In an example, the device has a signal processing block provided on the substrate member and coupled to the input/output block. The signal processing block is configured to the input/output block using a bi-direction bus in an intermediary protocol in an example. The device has a driver module provided on the substrate member and coupled to the signal processing block. In an example, the driver module is coupled to the signal processing blocking using a uni-directional multi-lane bus. In an example, the device has a driver interface provided on the substrate member and coupled to the driver module and configured to be coupled to a silicon photonics device. In an example, the driver interface is configured to transmit output data in either an amplitude modulation format or a combination of phase/amplitude modulation format or a phase modulation format. The device has a receiver module comprising a TIA block provided on the substrate member and to be coupled to the silicon photonics device using predefined modulation format, and is configured to the digital signal processing block to communicate information to the input output block for transmission through the data input/output interface. In an example, the device has a communication block provided on the substrate member and operably coupled to the input/output block, the digital signal processing block, the driver block, and the receiver block, and others, although there can be variations. In an example, the device has a communication interface coupled to the communication block and a control block provided on the substrate member and coupled to the communication block.

In an example, the present invention provides a monolithically integrated system-on-chip device configured for a multi-rate and selected format of data communication. In an example, the device has a single silicon substrate member. The device has a data input/output interface provided on the substrate member and configured for a predefined data rate and protocol. In an example, the data input/output interface is configured for number of lanes numbered from four to one hundred and fifty, although there can be variations. In an example, the device has an input/output block provided on the substrate member and coupled to the data input/output interface. In an example, the input/output block comprises a SerDes block, a CDR block, a compensation block, and an equalizer block, among others. In an example, the SerDes block is configured to convert a first data stream of X into a second data stream of Y, where X and Y are different integers. Each of the first data stream has a first predefined data rate at a first clock rate and each of the second data stream has a second predefined data rate at a second clock rate in an example. In an example, the device has a signal processing block provided on the substrate member and coupled to the input/output block. In an example, the signal processing block is configured to the input/output block using a bi-direction bus in an intermediary protocol. In an example, the device has a driver module provided on the substrate member and coupled to the signal processing block. In an example, the driver module is coupled to the signal processing blocking using a uni-directional multi-lane bus configured with N lanes, whereupon N is greater than M such that a difference between N and M represents a redundant lane or lanes. In an example, the device has a mapping block configured to associate the M lanes to a plurality of selected laser devices for a silicon photonics device. The device also has a driver interface provided on the substrate member and coupled to the driver module and configured to be coupled to the silicon photonics device. In an example, the driver interface is configured to transmit output data in either an amplitude modulation format or a combination of phase/amplitude modulation format or a phase modulation format. In an example, the device has a receiver module comprising a TIA block provided on the substrate member and to be coupled to the silicon photonics device using predefined modulation format, and configured to the digital signal processing block to communicate information to the input output block for transmission through the data input/output interface. The device has a communication block provided on the substrate member and operably coupled to the input/output block, the digital signal processing block, the driver block, and the receiver block, among others. The device has a communication interface coupled to the communication block and a control block provided on the substrate member and coupled to the communication block.

In an example, the present disclosure provides an integrated single-chip control device for communicating with the silicon photonics device. The integrated single-chip control device includes a silicon substrate member and a data input/output interface provided on the silicon substrate member and configured for a predefined data rate and protocol and an input/output block provided on the silicon substrate member and coupled to the data input/output interface. The input/output block includes a transmitting block for a very-short-reach (VSR) network host and a receiving block for the VSR host. Additionally, the integrated single-chip control device includes a signal processing block provided on the silicon substrate member and coupled to the input/output block using a bi-direction bus in an intermediary protocol. Further, the integrated single-chip control device includes a driver module provided on the silicon substrate member and coupled to the signal processing block using a uni-directional multi-lane bus and a driver interface provided on the silicon substrate member and coupled to the driver module and configured to be coupled to a silicon photonics device. The driver interface is configured to transmit output data in an amplitude modulation format. Furthermore, the integrated single-chip control device includes a receiver module provided on the silicon substrate member and to couple to the silicon photonics device using predefined modulation format to receive information converted from optical signals and configured to couple to the signal processing block to communicate information to the input/output block for transmission through the data input/output interface. Moreover, the integrated single-chip control device further includes a communication block provided on the silicon substrate member and operably coupled to the input/output block, the signal processing block, the driver module, and the receiver module for multiple series communications and a communication interface coupled to the communication block.

In an example, the present invention provides an integrated system-on-chip device having a self test using a loop back technique. In an example, the device has a self-test block provided on the substrate, the self test block being configured to receive a loop back signal from at least one of the digital signal processing block, the driver module, or the silicon photonics device. In an example, the self test block comprises a variable output power switch configured to provide a stress receiver test from the loop back signal.

In an example, the invention provides an integrated system-on-chip device having a redundant laser or lasers configured for each channel. In an example, the device has a plurality of laser devices configured on the silicon photonics device. At least a pair of laser devices is associated with a channel and coupled to a switch to select one of the pair of laser devices to be coupled to an optical multiplexer to provide for a redundant laser device.

In an example, the present invention provides an integrated system-on-chip device having a built-in self test technique. In an example, the device has a self test block configured on the silicon photonics device and to be operable during a test operation. In an example, the self test block comprises a broad band source configured to emit electromagnetic radiation from 1200 nm to 1400 nm or 1500 to 1600 nm to a multiplexer device. In an example, the broad band source can be an LED or other suitable device. The device also includes a self test output configured to a spectrum analyzer device external to the silicon photonics device.

In another aspect, the present disclosure provides an optical module for communicating a peer to peer transaction to transmit cryptocurrency. The optical module includes a substrate member, a memory resource, and a cryptocurrency wallet provided on the memory resource. Additionally, the optical module includes an optical communication block with a direct-to-cloud interface for connecting to one or more entities in a cloud infrastructure. Furthermore, the optical module includes an application block to enable a cryptocurrency transaction via the direct-to-cloud interface. Moreover, the optical module includes an external interface connecting the application block to a physical layer. In an embodiment, the optical module is configured to be an optical Quantum Key Generation Distribution device using a quantum key generation encryption protocol to encrypt a private key protected transaction in an encrypted transaction envelope. The optical module is configured to be a portable device with one of pluggable modules of QSFP, SFF, OSFP, and CFP, carrying a hardware level encrypted cryptocurrency wallet for timely execution of peer to peer transaction.

In an alternative embodiment, the present disclosure provides a method for communicating a peer to peer transaction to transmit cryptocurrency in an optical communication network. The method includes providing a first silicon photonics based optical module associated with a host having a public key. The first silicon photonics based optical module includes a substrate member; a memory resource; a cryptocurrency wallet with a first private key provided on the memory resource; an optical communication block with a direct-to-cloud interface for connecting to one or more entities in a cloud infrastructure; an application block to enable a cryptocurrency transaction via the direct-to-cloud interface; and an external interface connecting the application block to a physical layer. The method further includes connecting the first silicon photonics based optical module to the cloud infrastructure using the optical communication block via a public key. A second silicon photonics based optical module associated with a client is connected to the cloud infrastructure. The second silicon photonics based optical module is substantially the same as the first silicon photonics based optical module and has a cryptocurrency wallet with a second private key. Additionally, the method includes transferring an optical signal with information of the cryptocurrency transaction with an encrypted envelope from the cryptocurrency wallet in the first silicon photonics based optical module to the cloud infrastructure. Furthermore, the method includes receiving the optical signal from the cloud infrastructure to decrypt the cryptocurrency transaction via the public key by the second silicon photonics based optical module. Moreover, the method includes storing information of the cryptocurrency transaction into the cryptocurrency wallet in the second silicon photonics based optical module via the second private key.

The present invention achieves these benefits and others in the context of known memory technology. However, a further understanding of the nature and advantages of the present invention may be realized by reference to the latter portions of the specification and attached drawings.

BRIEF DESCRIPTION OF THE DRAWINGS

The following diagrams are merely examples, which should not unduly limit the scope of the claims herein. One of ordinary skill in the art would recognize many other variations, modifications, and alternatives. It is also understood that the examples and embodiments described herein are for illustrative purposes only and that various modifications or changes in light thereof will be suggested to persons skilled in the art and are to be included within the spirit and purview of this process and scope of the appended claims.

DETAILED DESCRIPTION OF THE INVENTION

Figure 1:
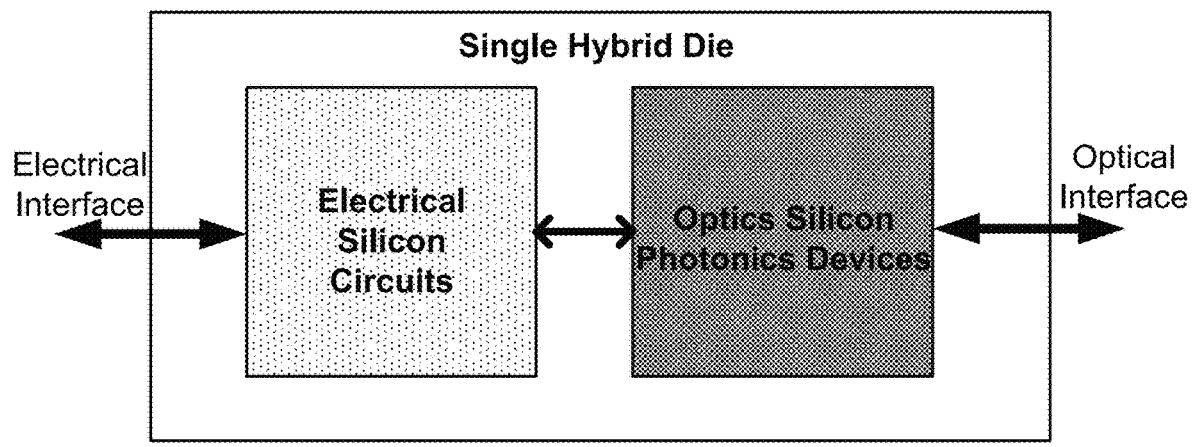
FIG. 1 is a simplified diagram of a single hybrid die (Both electrical and optics devices are fabricated on a single hybrid die) according to an embodiment of the present invention.

This present invention relates to telecommunication techniques. More specifically, various embodiments of the present invention provide a communication interface that is configured to transfer data at high bandwidth over optical communication networks. In certain embodiments, the communication interface is used by various devices, such as spine switches and leaf switches, within a leaf-spine network architecture, which allows large amount of data to be shared among servers. In some embodiments, a single Silicon Photonics based optical module configured as a receiving optical transceiver as well as a transmitting optical transceiver can be integrated via the communication interface to transfer data at high bandwidth over optical communication networks. Specifically, a system and a method using the Silicon Photonics based optical module for storing cryptocurrency and implementing secure communications for peer-to-peer transactions are disclosed.

In the last decades, with advent of cloud computing and data center, the needs for network servers have evolved. For example, the three-level configuration that have been used for a long time is no longer adequate or suitable, as distributed applications require flatter network architectures, where server virtualization that allows servers to operate in parallel. For example, multiple servers can be used together to perform a requested task. For multiple servers to work in parallel, it is often imperative for them to be share large amount of information among themselves quickly, as opposed to having data going back forth through multiple layers of network architecture (e.g., network switches, etc.).

Leaf-spine type of network architecture is provided to better allow servers to work in parallel and move data quickly among servers, offering high bandwidth and low latencies. Typically, a leaf-spine network architecture uses a top-of-rack switch that can directly access into server nodes and links back to a set of non-blocking spine switches that have enough bandwidth to allow for clusters of servers to be linked to one another and share large amount of data.

In a typical leaf-spine network today, gigabits of data are shared among servers. In certain network architectures, network servers on the same level have certain peer links for data sharing. Unfortunately, the bandwidth for this type of set up is often inadequate. It is to be appreciated that embodiments of the present invention utilizes PAM (e.g., PAM8, PAM12, PAM16, etc.) in leaf-spine architecture that allows large amount (up terabytes of data at the spine level) of data to be transferred via optical network.

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the Claims herein is not intended to invoke the provisions of 35 U.S.C. 112, Paragraph 6.

Please note, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

FIG. 1 is a simplified diagram of a single hybrid die (Both electrical and optics devices are fabricated on a single hybrid die) according to an embodiment of the present invention. In an example, the present device comprises a single hybrid communication module made of silicon material. The module comprises a substrate member having a surface region, an electrical silicon chip overlying a first portion of the surface region, a silicon photonics device overlying a second portion of the surface region, a communication bus coupled between the electrical silicon chip and the silicon photonics device, an optical interface coupled to the silicon photonics device, and an electrical interface coupled to the electrical silicon die.

Figure 2:
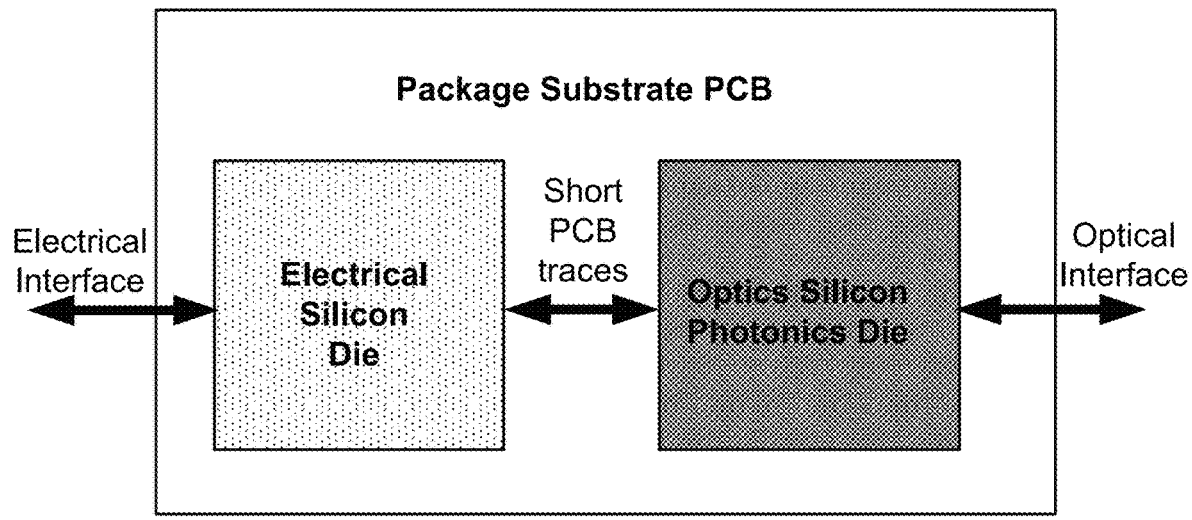
FIG. 2 is a simplified diagram of a multi-chip module according to an embodiment of the present invention.

FIG. 2 is a simplified diagram of a multi-chip module according to an embodiment of the present invention. In an example, the present device comprises a single hybrid communication module. The module comprises a substrate member having a surface region, which can be a printed circuit board or other member. The module comprises an electrical silicon chip overlying a first portion of the surface region, a silicon photonics device overlying a second portion of the surface region, a communication bus coupled between the electrical silicon chip and the silicon photonics device, an optical interface coupled to the silicon photonics device, and an electrical interface coupled to the electrical silicon die.

Figure 2A:
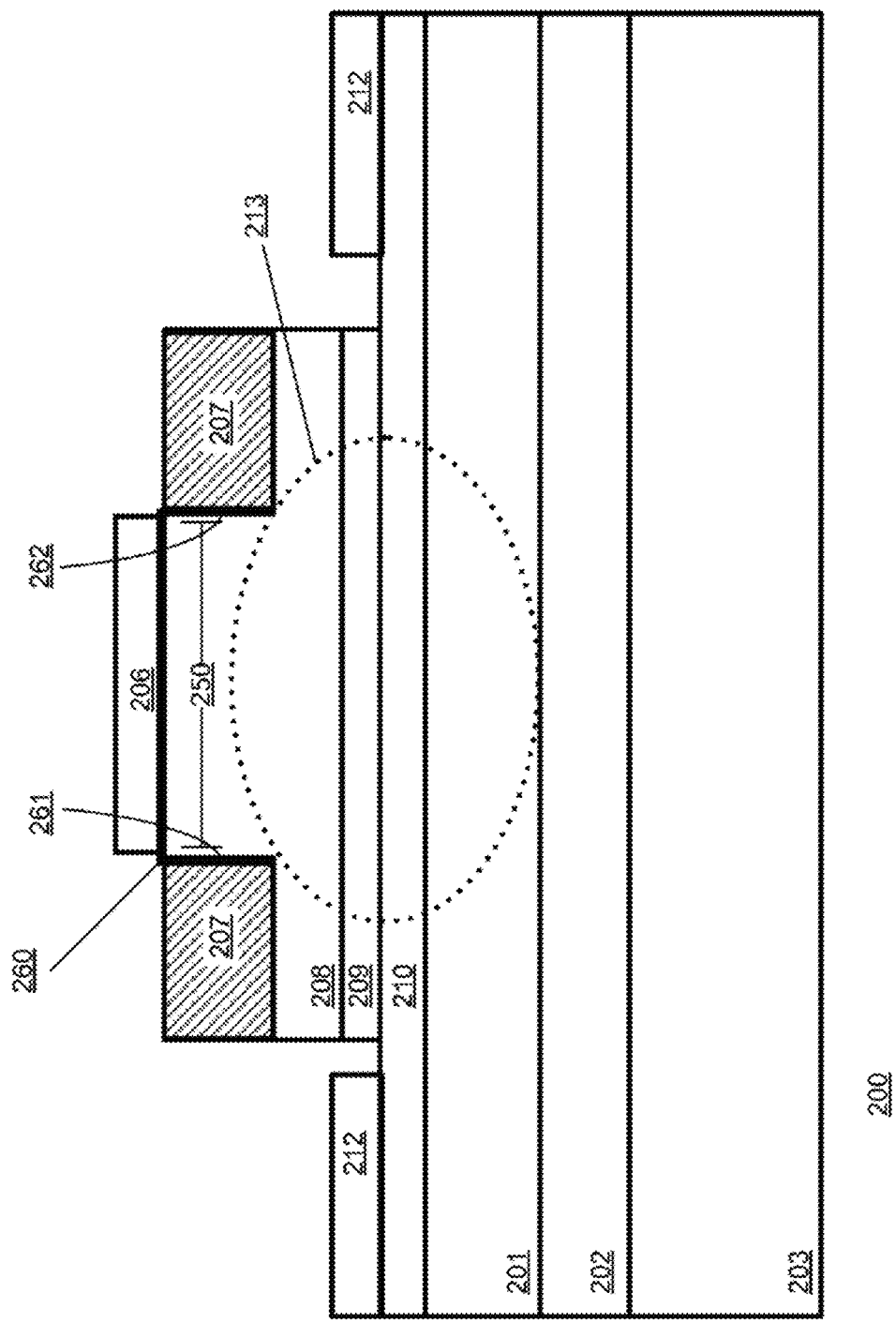
FIG. 2A is a simplified diagram of an exemplary hybrid silicon photonics device.

As shown in FIG. 1, the single hybrid die includes a hybrid silicon photonics device having an electrical circuit for processing and controlling a silicon photonics module. In an example, the hybrid silicon photonics device is described in U.S. Pat. No. 8,380,033, in the name of Fang, et al. issued Feb. 19, 2013, hereby incorporated by reference. FIG. 2A shows a simplified block diagram of an exemplary hybrid silicon photonics device.

In this example, electro-optic device 200 includes a silicon semiconductor slab including silicon top layer 201, vertical confinement layer 202 and silicon substrate 203. Alternatively, substrate layer 203 may be a diamond substrate, a glass substrate, or any functional equivalent. Vertical confinement layer 202 may be formed of any dielectric material suitable for confining an optical mode (e.g., layer 201 may be a silicon dioxide layer, a silicon nitride layer, or any functionally equivalent insulating layer with a refractive index lower than silicon top layer 201).

Device 200 further includes a III-V semiconductor slab including p-type layer 208, active layer 209 and n-type layer 210 (thereby forming a P-I-N diode). The term "p-type layer," as used herein, describes a layer comprising a material that has more positive carriers (i.e., holes) than negative carriers (i.e., electrons). The term "n-type layer," as used herein, describes a layer comprising a material that has more negative carriers than positive carriers.

Alternatively, layer 208 may be an n-type layer, and layer 210 may be a p-type layer. Or, layers 208 and 210 may be n-type layers, while active region 209 may include a tunnel junction to convert n-type majority carriers to p-type majority carriers. This avoids the associated optical and microwave loss of p-type materials due to the use of p-dopants.

III-V semiconductor materials have elements that are found in group III and group V of the periodic table (e.g., Indium Gallium Arsenide Phosphide, Gallium Indium Arsenide Nitride). The carrier dispersion effects of III-V based materials may be significantly higher than in silicon based materials for bandgaps closer to the wavelength of the light being transmitted or modulated, as electron speed in III-V semiconductors is much faster than that in silicon. In addition, III-V materials have a direct bandgap which is required for the most efficient creation of light from electrical pumping. Thus, III-V semiconductor materials enable photonic operations with an increased efficiency over silicon for both generating light and modulating the refractive index of light.

Active layer 209 is of a III-V semiconductor with high electro-optic efficiency, i.e., the absorption coefficient (i.e., the imaginary portion of the complex refractive index) and the refractive index (i.e., the real portion of the complex refractive index) of active layer 209 is easily affected by either the Franz Kheldysh effect if active layer 209 comprises bulk material (e.g., intrinsic Indium Gallium Arsenide Phosphide or Indium Aluminum Gallium Arsenide or the Quantum Confined Stark Effect if active layer 209 comprises multiple quantum wells.

Optical waveguide 250 is formed by ridge 260 (which is "bolded" or "thicker" in the figure for illustrative purposes only), including ridge sides 261 and 262. It is clear that in this embodiment, waveguide 250 is formed by features in the III-V region of device 200 as opposed to being formed by features in the silicon region of the device, wherein waveguide is formed by voids included in silicon top region. Thus, the silicon and III-V regions of device 200 have a greater contact area than devices in the prior art (where layer 210 was continuously coupled to layer 201).

Overclad regions 207 may be formed on the device to improve mechanical stability, and may be of any material used to form vertical confinement layer 202 or any material with a lower refractive index than layer 208. Overclad regions 207 further provide vertical optical confinement and passivation as described below. The areas adjacent to ridge sides 261 and 262 provide optical confinement if left as voids (i.e., areas comprising air), but that forming overclad regions 207 provides for mechanical stability in addition to optical confinement.

Thus, optical mode 213 is vertically confined by vertical confinement layer 202, ridge 260 and overclad regions 207 while being laterally confined by ridge sides 261 and 262. Said ridge sides also confine injection current from electrode 206 towards the portion of active layer 209 that overlaps optical mode 213. The need for the etched regions and implanted regions is eliminated in the example shown above.

It is understood that the optical device of FIG. 2A may be used to amplify, modulate or detect light transmitted through the optical waveguide of the device by applying an electrical difference to complimentary electrodes 206 and 212 to either forward bias (i.e., for amplification) or reverse bias (i.e., for modulation or detection) the structure. The complex refractive index (i.e., at least one of the real and the imaginary refractive index) of at least the portion of active layer 209 included in optical mode 213 changes based on an electrical difference (e.g., electrical voltage, electrical field) applied to electrodes 206 and 212. These changes to the refractive index (or indexes) are proportional to the strength of the electrical difference applied to electrodes 206 and 212.

In this example, electrodes 212 are coupled to n-type layer 210. Thus, it is to be understood that there is no electrical conduction through silicon top layer 201. As opposed to variations where electrical conduction does occur through the silicon top layer of a device, resistance is high as it determined by thin layer 210; however, there are less processing steps needed to create device 200 and no conductive bond is required to couple the silicon region with the III-V region (i.e., no conductive bond is required to couple layers 210 and 201).

Other examples of silicon photonic devices are manufactured by Intel Corporation of Santa Clara, CA, Skorpis Technology, Inc. 5600 Eubank Blvd. NE Suite 200, Albuquerque, NM 87111, Luxtera, Inc. of 2320 Camino Vida Roble, Carlsbad, CA 92011, Mellanox Technologies, Inc. 350 Oakmead Parkway, Suite 100 Sunnyvale, CA 94085, and am Lightwire, Inc. Headquartered in Allentown, Penn (now Cisco Systems, Inc., Corporate Headquarters, 170 West Tasman Dr., San Jose, CA 95134) among others.

Figure 3:
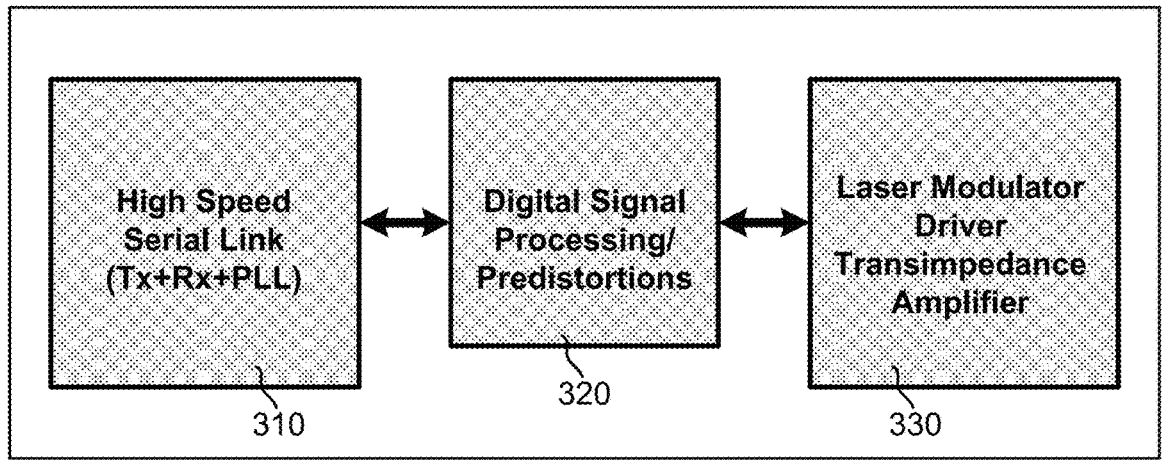
FIG. 3 is a simplified diagram of an electrical silicon die block according to an embodiment of the present invention.

FIG. 3 is a simplified diagram of an electrical silicon die block according to an embodiment of the present invention. This diagram is merely an example, which should not unduly limit the scope of the claims. One of ordinary skill in the art would recognize many variations, alternatives, and modifications. In an embodiment, the electrical silicon die block is an electrical signal processing block that connects a low speed electrical interface to a high speed optical interface. There are several elements to this block diagram. As shown, the electrical silicon die block includes a high-speed serial link 310, a digital signal processing/pre-distortion unit 320, and a laser modulator driver and TIA unit 330. The high-speed serial link 310 includes an input/output block having an RX (receiving) functional unit and a TX (transmitting) function unit coupled to a phase lock loop circuit. For example, the TX function unit drives the loopback signals that are processed by the RX functional unit. Using the high speed serial link 310, the data first is able to be converted from the many parallel streams of lower speed data into a high speed serial stream (there may be more than one such high speed stream depending on the total data rate). The digital signal processing/pre-distortion unit 320 is configured to process or convert digital electrical signal back and forth to optical signal and conduct all signal modulation, error encoding/decoding, and signal distortion compensation. The high-speed streams converted by the high-speed serial link 310 are then encoded and digitally compensated to account for distortions in the transmit and receive paths. The final interface to the optical components is achieved via the modulator driver (transmit path) and the transimpedance amplifier (receive path). The laser modulator driver and TIA unit 330 is configured to control the optical device (such as the optics silicon photonics die on the part of the multi-chip module in FIG. 2). In a specific embodiment, the electrical silicon die block is a single hybrid die as part of the multi-chip module shown in FIG. 2.

Figure 4:
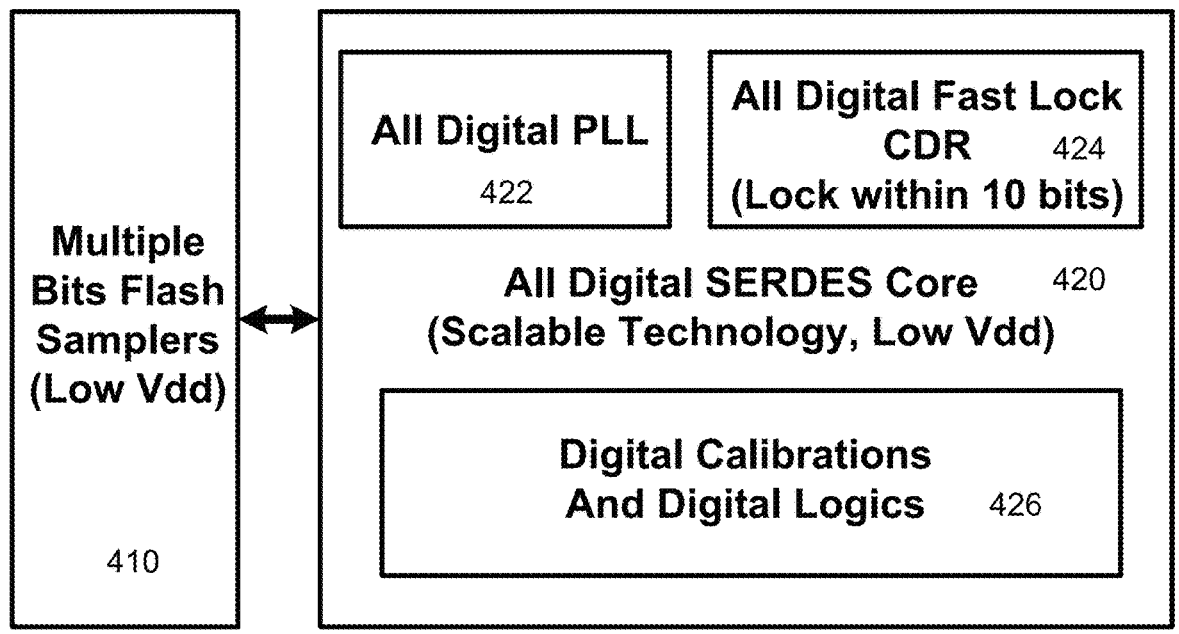
FIG. 4 is a simplified diagram of high-speed serial link block according to an embodiment of the present invention.

FIG. 4 is a simplified diagram of high-speed serial link block according to an embodiment of the present invention. This diagram is merely an example, which should not unduly limit the scope of the claims. One of ordinary skill in the art would recognize many variations, alternatives, and modifications. As shown, the high-speed serial link block provides details of the signal interface between the high speed optical and the lower speed electrical sides. In an embodiment, the high-speed serial link block comprises multiple Bits Flash Samplers 410 and an All digital SerDes core unit 420 powered under a low Vdd power supply. The samplers 410 are part of RX functional unit of the input/output block 310. The all digital SerDes core unit 420 comprises an all digital phase lock loop (PLL) block 422, a fast lock CDR block 424, and Digital offset calibrations and logics block 426, also belonging to the RX functional unit (310 of FIG. 3). In another embodiment, the high-speed serial link block is an electrical input/output block provided on either a single chip or a silicon die of package substrate member and coupled to the data input/output interface. Some of the essential components of the electrical input/output block are CDR (clock and data recovery circuits), PLL (phase lock loops), and SerDes (Serializers and Deserializers). In an example, the input/output block comprises a SerDes block, a CDR block, a compensation block, and an equalizer block, among others. The output of equalizer includes receiver input. These circuits in combination convert multiple streams of input data (electrical side) to fewer streams of output data (optical side). These circuits also need to be calibrated and controlled to operate correctly.

Figure 5:
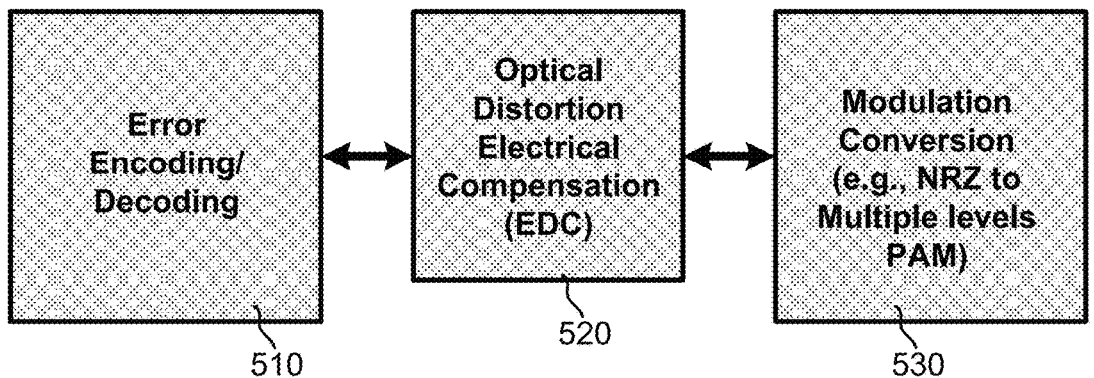
FIG. 5 is a simplified diagram of a digital processing/signal pre-distortion block according to an embodiment of the present invention.

FIG. 5 is a simplified diagram of a digital processing/signal pre-distortion block according to an embodiment of the present invention. This diagram is merely an example, which should not unduly limit the scope of the claims. One of ordinary skill in the art would recognize many variations, alternatives, and modifications. As shown, the digital processing/signal pre-distortion block comprises at least an Error Encoding/Decoding block 510, an Optical Distortion/Electrical Compensation (EDC) block 520, and a Modulation Conversion block 530. In an example, it shows the details of a possible implementation of the electronic processing blocks in the transmit and receive paths. In an alternative embodiment, some of those blocks may be configured differently in the transmit versus the receive path. One of the essential blocks is the Error Encoding/Decoding block 510 which performs data error control coding. As additional data bits are added to blocks of signal data in such a way that when errors occur they may be correctable in the receive path. Modern error control codes are sophisticated that they can correct, e.g., up to 1 error in every 100 bits with modest data overhead and latency. Optical distortion compensation block 520 helps compensate for impairments in the optical and electrical transmission paths. These could include compensation of, e.g., bandwidth limitations and inter-symbol interference. The modulation conversion block 530 codes and decodes the multi-level higher-order modulation signals that are used at the transmitter and receiver, and converts them to the simple two-level NRZ format used in the lower speed interfaces.

Figure 6:
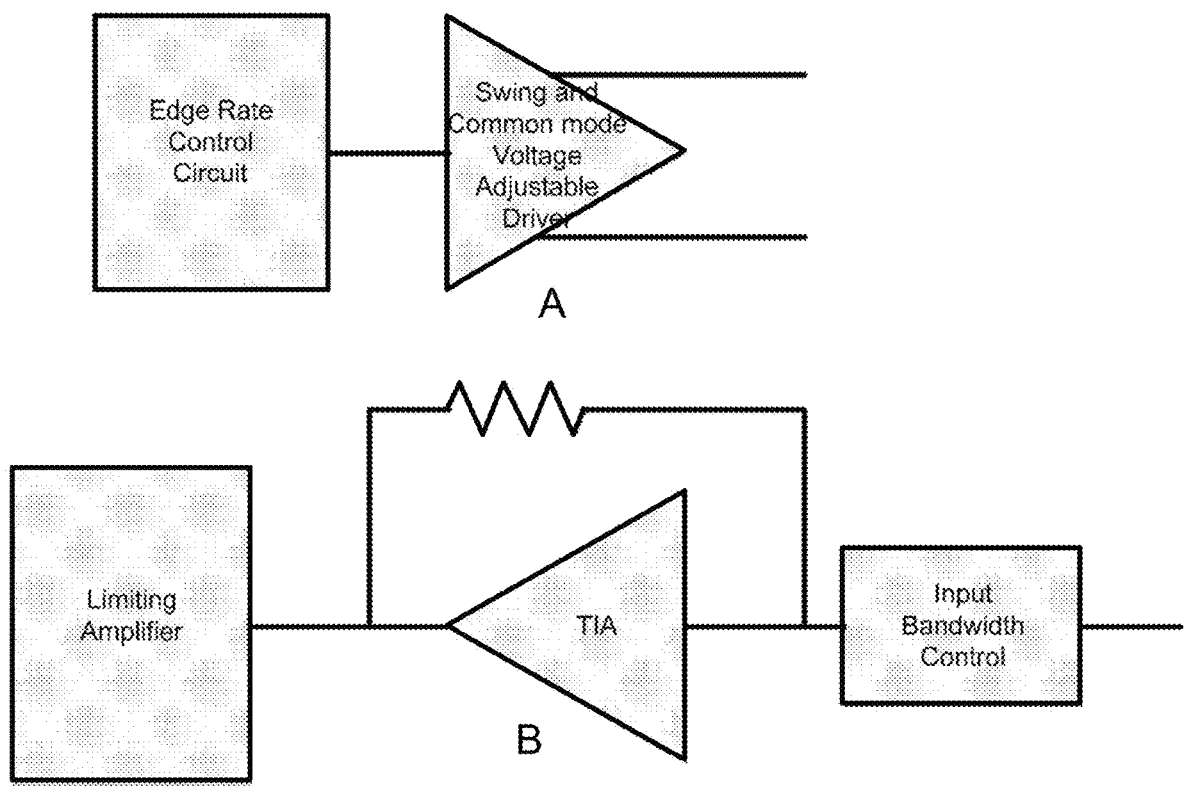
FIG. 6 is a simplified diagram of an electrical laser driver and TIA block diagram according to an embodiment of the present invention.

FIG. 6 is a simplified diagram of an electrical laser driver and TIA block diagram according to an embodiment of the present invention. This diagram is merely an example, which should not unduly limit the scope of the claims. One of ordinary skill in the art would recognize many variations, alternatives, and modifications. As shown, the top part circuit (A) of an electrical laser driver and TIA block shows a driver circuit for the modulator and the receiver circuit for a photo diode detector (to be shown in FIG. 7 below). The electrical output of the top circuit (A) is used to drive the modulator. The modulator imprints the electrical signal input on to the optical carrier. The output of the photo diode detector is the input to the bottom part circuit (B) of the electrical laser driver and TIA block. This circuit converts the current signal from the photo diode detector into a voltage signal which can then be processed by other circuits. In an example, the electrical laser driver and TIA block is block 330 included in the electrical silicon die block shown in FIG. 3.

Figure 7:
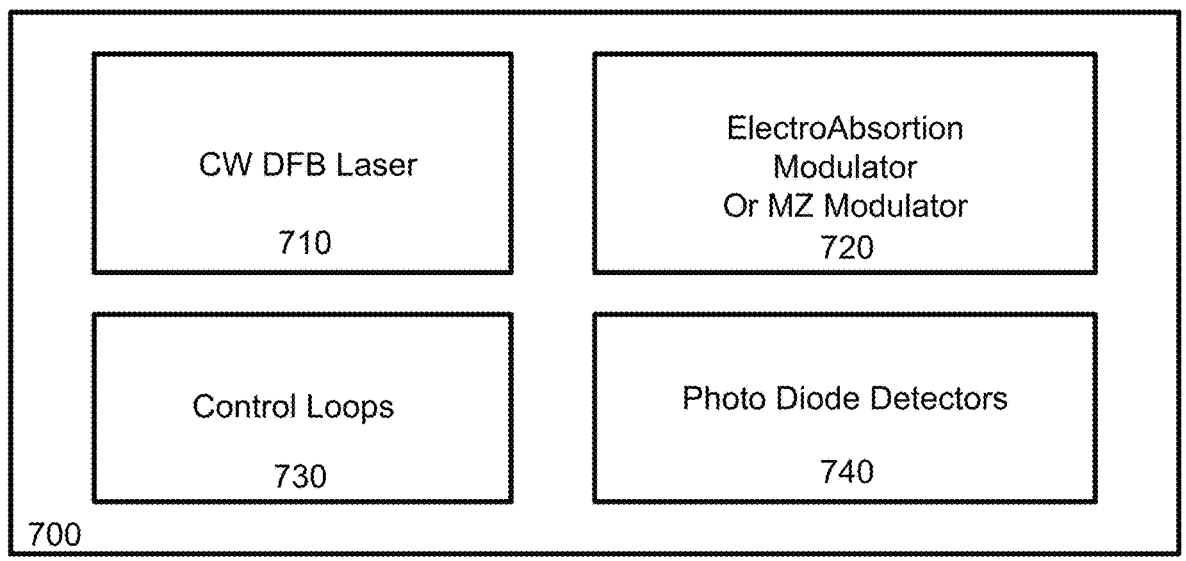
FIG. 7 is a simplified diagram of a silicon photonic block diagram according to an embodiment of the present invention.

FIG. 7 is a simplified diagram of a silicon photonic block diagram according to an embodiment of the present invention. This diagram is merely an example, which should not unduly limit the scope of the claims. One of ordinary skill in the art would recognize many variations, alternatives, and modifications. As shown, in an embodiment, a silicon photonic block 700 includes a laser source 710, a laser modulator 720, a control loop 730, and one or more photo detectors 740. In a specific embodiment, the silicon photonic block 700 includes common blocks of an optical sub-system including control loops. The transmit path of the optical sub-system includes a laser source 710 which can be selected from a CW (continuous wave) DFB (distributed feedback) laser among others. The laser source 710 provides the optical carrier. The output from the laser source 710 is optically coupled into the laser modulator 720. The electrical data is converted to optical via the modulator for modulating the optical signal directly from the laser source 710. The modulator 720 may be an electro-absorption modulator or a Mach-Zehnder (MZ) modulator, or others depending on embodiments. The output signal from the modulator 720 is then coupled to a fiber (not shown) for external transmission.

The receive path of the optical sub-system includes the optical signal from the fiber coupled into one or more photo diode detectors 740. The photo diode detector 740 converts the optical data into electrical data. The control loops 730 are needed to correctly bias the laser source 710, the modulator 720, and the one or more photo diode detectors 740. The bias control signals may include current or voltage outputs used to setup the laser source, modulator, and the photo diode detector correctly. The control output signals may also be continually adjusted using the feedback from the devices themselves. Optionally, the silicon photonic block 700 includes silicon-based optical mux/demux devices configured to be coupled directly with optical fibers. Optionally, the silicon photonic block 700 is configured to be a silicon photonics device with all the components described herein integrated in a single die. Optionally, the single-die silicon photonics device is used to couple with other opto-electric control blocks in either single-chip or multi-chip forms in an integrated system-on-a-chip in the communication network.

Figure 8:
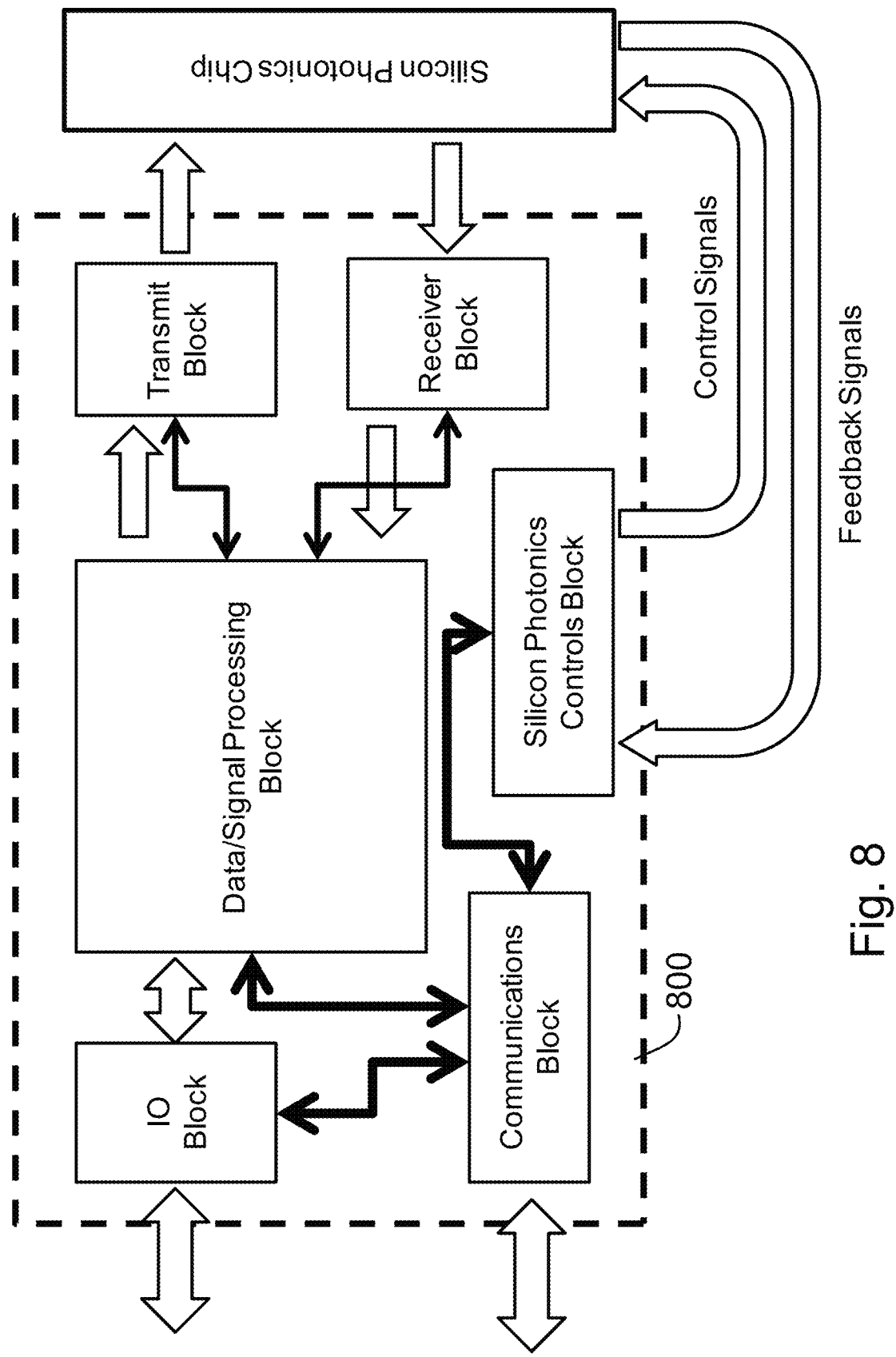
FIG. 8 is a simplified block diagram of a multi-chip module for silicon photonics according to an embodiment of the present invention.

FIG. 8 is a simplified block diagram of a multi-chip module for silicon photonics according to an embodiment of the present invention. As shown, the present invention includes an integrated system-on-chip device. The device is configured on a single silicon substrate member. The device has a data input/output interface provided on the silicon substrate member and configured for a predefined data rate and protocol. The device has an input/output block provided on the silicon substrate member and coupled to the data input/output interface. In an example, the input/output block comprises a SerDes block, a CDR block, a compensation block, and an equalizer block, among others. The device has a signal processing block provided on the silicon substrate member and coupled to the input/output block. In an example, the signal processing block is configured to the input/output block using a bi-direction bus in an intermediary protocol. The device has a driver module provided on the silicon substrate member and coupled to the signal processing block. In an example, the driver module is coupled to the signal processing blocking using a uni-directional multi-lane bus. In an example, the device has a driver interface provided on the silicon substrate member and coupled to the driver module and configured to be coupled to a silicon photonics device. In an example, the driver interface is configured to transmit output data in either an amplitude modulation format or a combination of phase/amplitude modulation format or a phase modulation format. In an example, the device has a receiver module comprising a TIA block provided on the silicon substrate member and to be coupled to the silicon photonics device using predefined modulation format, and configured to the digital signal processing block to communicate information to the input output block for transmission through the data input/output interface. In an example, the device has a communication block provided on the silicon substrate member and operably coupled to the input/output block, the digital signal processing block, the driver block, and the receiver block, among others. The device has a communication interface coupled to the communication block. The device has a control block provided on the silicon substrate member and coupled to the communication block. In a specific embodiment, the control block is configured to receive and send instruction(s) in a digital format to the communication block and is configured to receive and send signals in an analog format to communicate with the silicon photonics device. In another specific embodiment, the integrated system-on-chip device is a single chip module 800.

In an example, the signal processing block comprises a FEC block, a digital signal processing block, a framing block, a protocol block, and a redundancy block, among others. The driver module is selected from a current drive or a voltage driver in an example. In an example, the driver module is a differential driver or the like. In an example, the silicon photonics device is selected from an electro absorption modulator (EAM) or electro optic modulator (EOM), or a Mach-Zehnder modulator (MZM). In an example, the amplified modulation format is selected from NRZ format or PAM format. In an example, the phase modulation format is selected from BPSK or nPSK. In an example, the phase/amplitude modulation is QAM. In an example, the silicon photonic device is configured to convert the output data into an output transport data in a WDM signal. In an example, the control block is configured to initiate a laser bias or a modulator bias. In an example, the control block is configured for laser bias and power control of the silicon photonics device. In an example, the control block is configured with a thermal tuning or carrier tuning device each of which is configured on the silicon photonics device. In an example, the SerDes block is configured to convert a first data stream of N into a second data stream of M.

Figure 9:
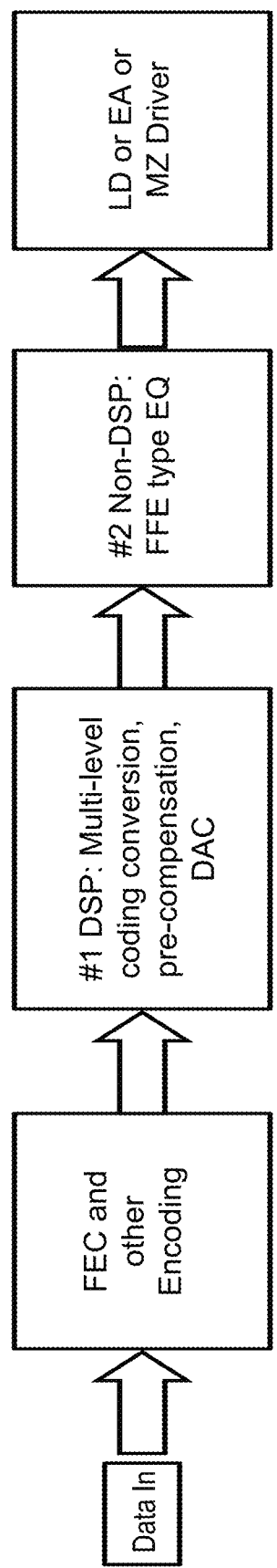
FIG. 9 is a simplified block diagram of data flow according to an embodiment of the present invention.

FIG. 9 is a simplified block diagram of data flow according to an embodiment of the present invention. As show is a stream of incoming data, which processed through multiple blocks. The blocks include, among others, forward error correction, and other encoding, multi-level coding, pre-compression, and digital to analog coding. The blocks also include non-DSP forward error correction, and a block corresponding to a laser diode or driver, among others. In an example, in the absence of a FEC from a host process, techniques include use of CDR2 type FEC, which is internal to the CMOS chip. In an example, FEC can be striped across each or all of data lanes. Of course, there can be variations, modifications, and alternatives.

Figure 10:
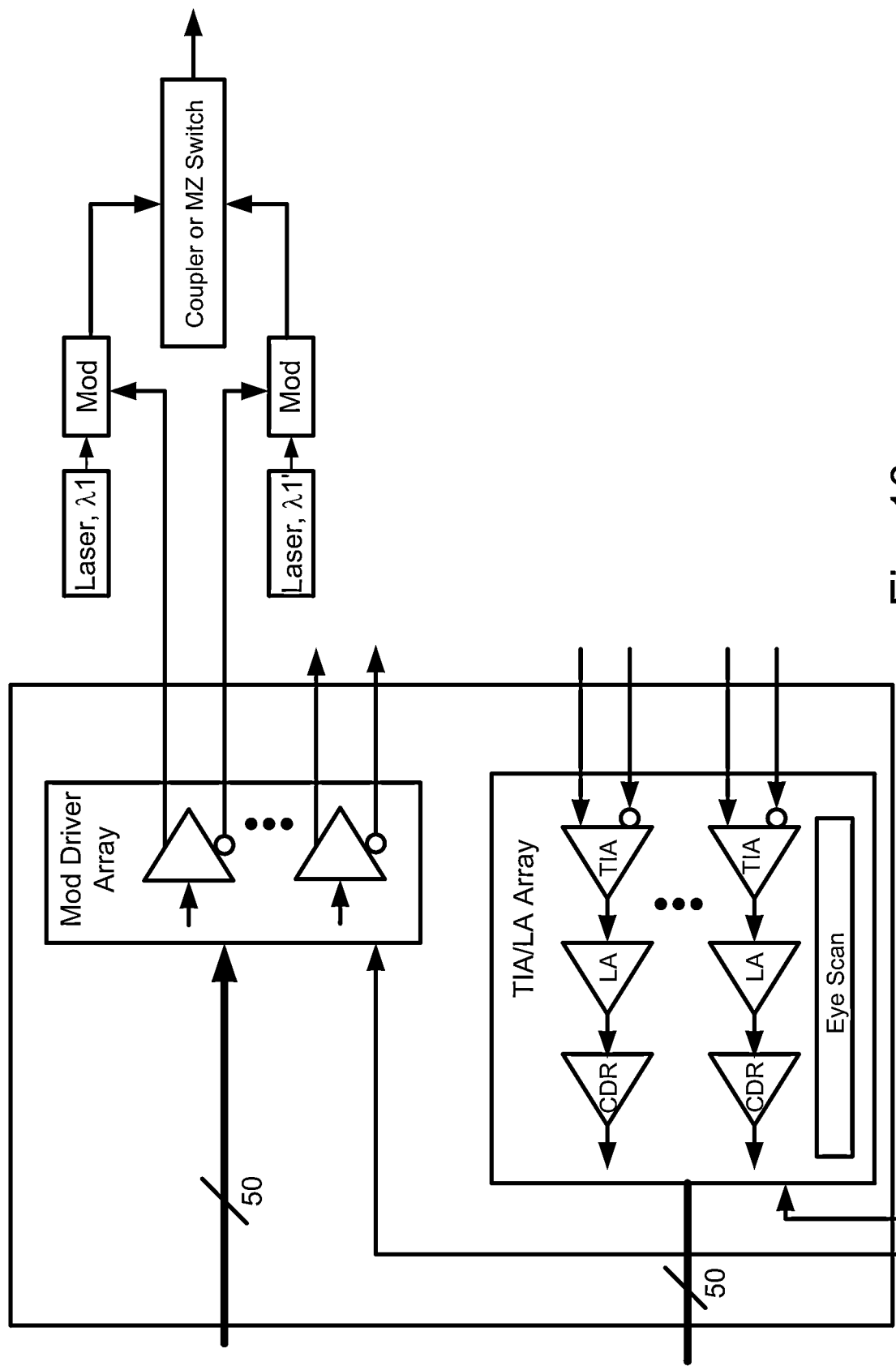
FIG. 10 is a simplified diagram illustrating a redundant laser configuration at a drive stage according to an embodiment of the present invention.

FIG. 10 is a simplified diagram illustrating a redundant laser configuration at a drive stage according to an embodiment of the present invention. In an example, the invention provides an integrated system-on-chip device as a fully redundant system having a redundant laser or lasers configured for each channel. In an example, the device has a plurality of laser devices configured on the silicon photonics device. At least a pair of laser devices is associated with a channel and coupled to a switch to select one of the pair of laser devices to be coupled to an optical multiplexer to provide for a redundant laser device. The worst case is to have 2 times total number of wavelengths with twice in chip size. In an embodiment, the switch is a Mach-Zehnder Interferometer (MZI) switch used to switch between a λ1 and a redundant λ1'. Or it could be a passive coupler. In another embodiment, it preserves the size of the wavelength multiplexer so that no additional λ channels are needed. Note, the integrated system-on-chip device doesn't have to operate the redundant λ1' until needed, therefore no power consumption penalty is applied.

Figure 11:
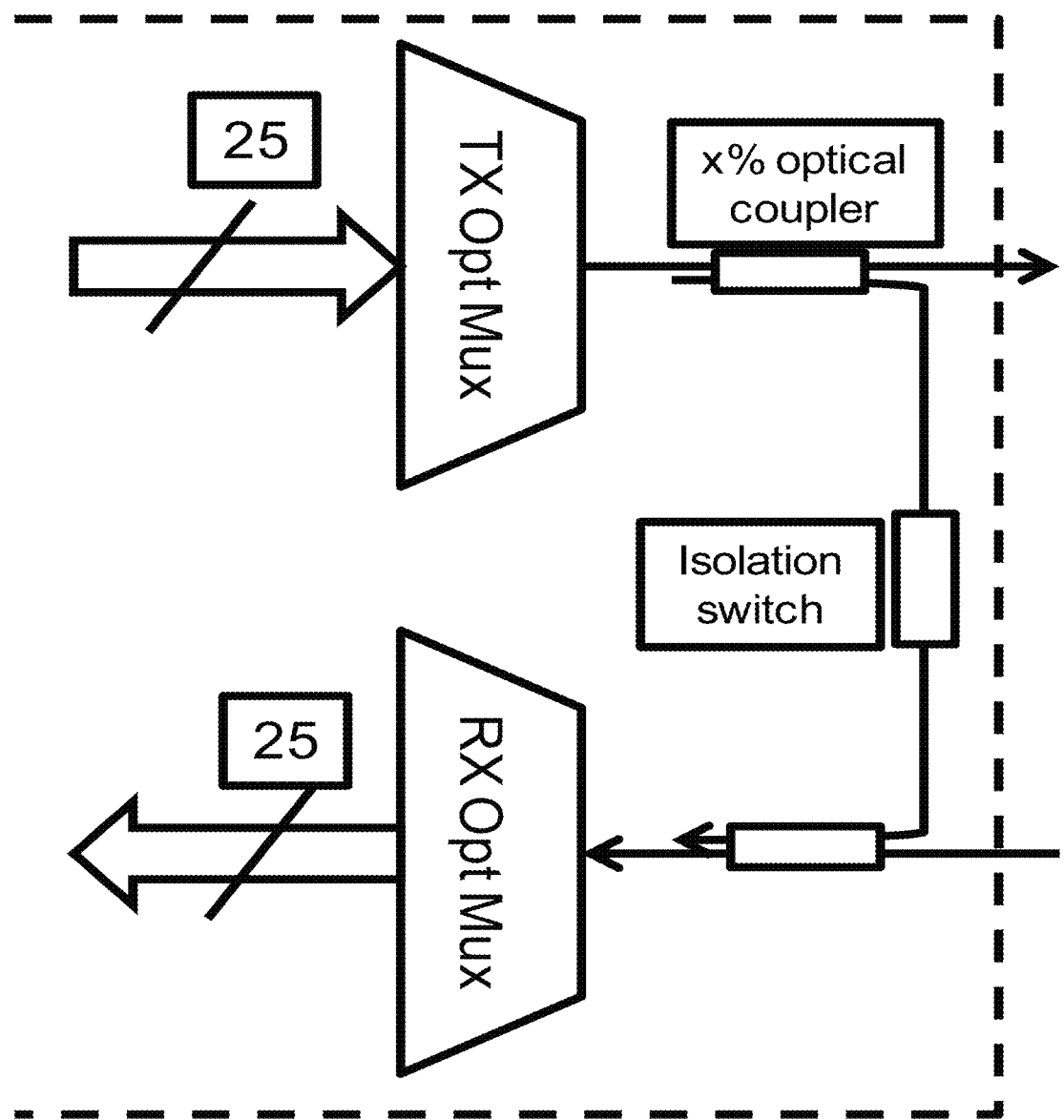
FIG. 11 is a simplified diagram illustrating a built-in self test using an optical loop back according to an embodiment of the present invention.

FIG. 11 is a simplified diagram illustrating a built-in self test using an optical loop back according to an embodiment of the present invention. As shown are a TX multiplexer and an RX multiplexer for a silicon photonics device. In an example, the present invention provides an integrated system-on-chip device having a self test using a loop back technique. In an example, the device has a self-test block provided on the substrate. In an example, the self test block is configured to receive a loop back signal from at least one of the digital signal processing block, the driver module, or the silicon photonics device. In an example, the self test block comprises a variable output power switch configured to provide a stress receiver test from the loop back signal. Also shown is an isolation switch between RX and TX.

In an example, the present technique allows a loop back test capability on the device, which is now a silicon photonic application specific integrated circuit or a communication system-on-chip device, as described. In an example, the technique is provided for diagnostic and setup during power up sequence. In an example, an optical tap coupler on the output side connected to the input side as shown. In an example as shown, x (e.g., <10%) is selected to reduce and/or minimize an impact an output power as well an impact at the input power given that input power is generally much lower than the output power. In an example, to prevent crosstalk in the present loop back path, an isolation switch has been configured as shown. In an example, without the isolation switch there is undesirably direct crosstalk between the output and input as shown. In an example, about 30 dB isolation is included to prevent coherent crosstalk. Of course, there can be variations.

Figure 12:
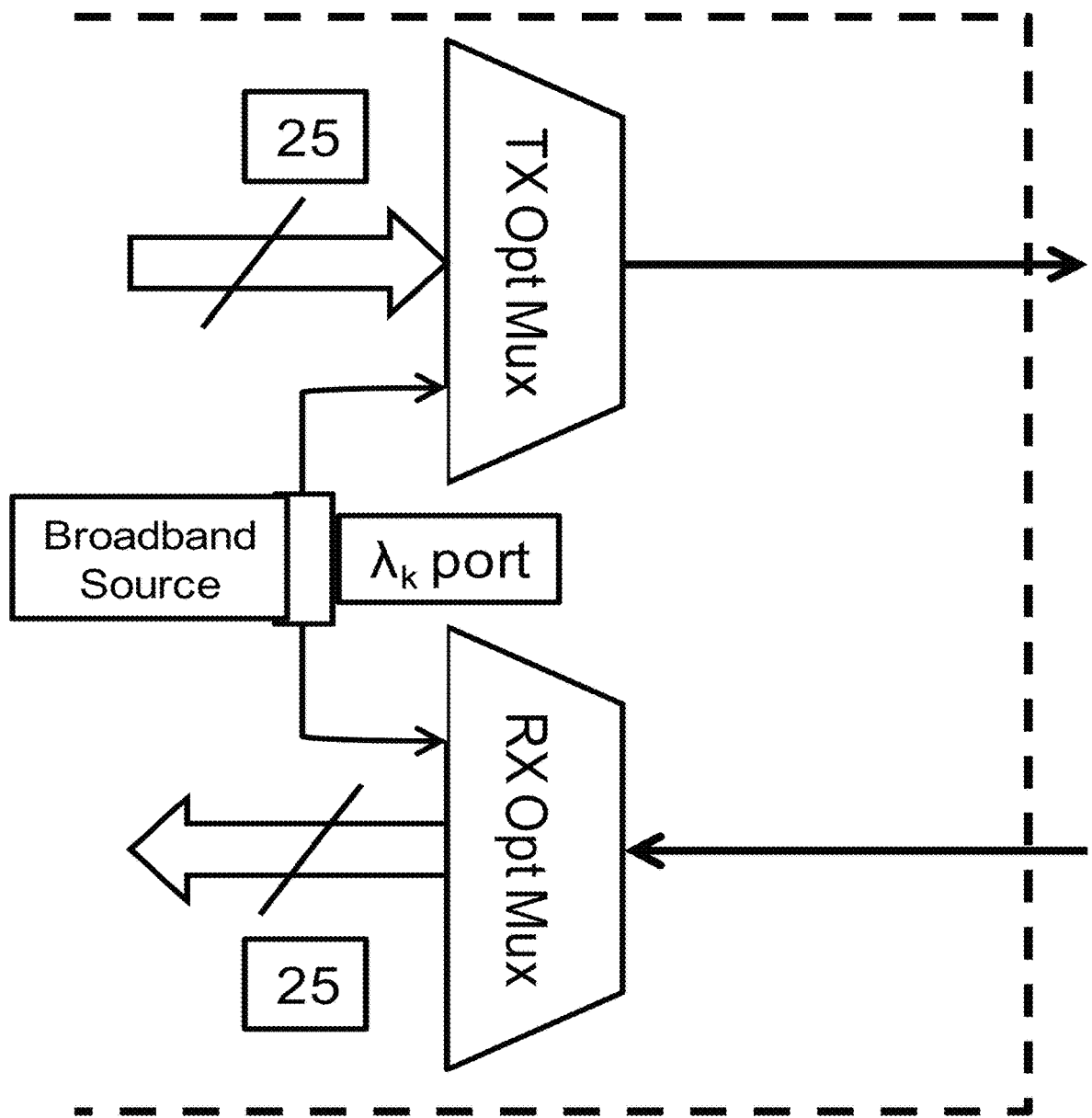
FIG. 12 is a simplified diagram illustrating a built-in self test configured for optical testing according to an embodiment of the present invention.

FIG. 12 is a simplified diagram illustrating a built-in self test configured for optical testing according to an embodiment of the present invention. In an example, the present invention provides an integrated system-on-chip device having a built-in self test technique. As shown are a TX multiplexer and an RX multiplexer for a silicon photonics device. A broad band source is coupled to each of the multiplexers. Multiple sources can also be included. In an example, the device has a self test block configured on the silicon photonics device and to be operable during a test operation. In an example, the self test block comprises a broad band source configured to emit electromagnetic radiation from 1200 nm to 1400 nm or 1500 to 1600 nm to a multiplexer device. In an example, the broad band source can be a LED or other suitable device. The device also includes a self test output configured to a spectrum analyzer device external to the silicon photonics device. In an example, the technique can be provided during a calibration process. That is, if after calibration, a center λ of each multiplexer changed, the present technique including built-in light source will quantify or indicate the change in an example. In an example, the broadband source in silicon photonics is a light source with no optical feedback, although there can be variations.

Figure 13:
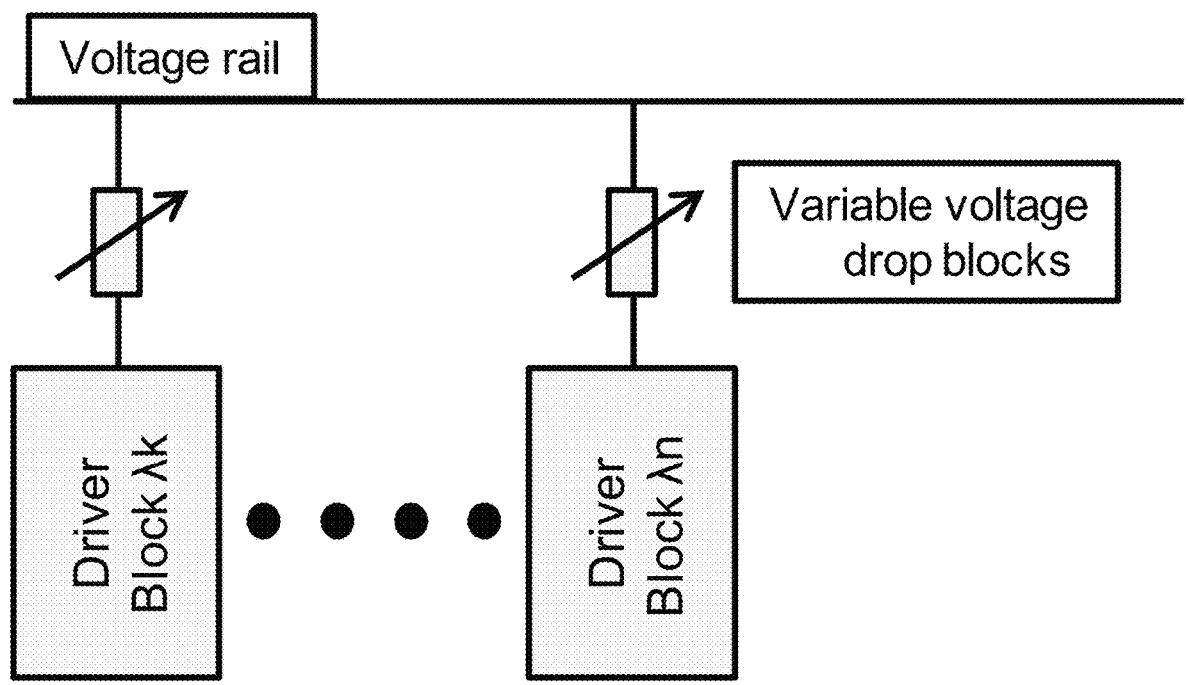
FIG. 13 is a simplified diagram illustrating a variable bias for optical elements configured within a silicon photonic device according to an embodiment of the present invention.

FIG. 13 is a simplified diagram illustrating a variable bias for optical elements configured in a silicon photonic device according to an embodiment of the present invention. As shown, optical elements, particularly, driver blocks comprising optical modulators, whether they are EAM's EOM's (which are really MZM's), need a DC bias for operation. The DC bias is a function of λ of operation and fabrication tolerances including temperature variations. For different λ of operation, the output or absolute transmission will vary with the bias voltage values. Accordingly, the bias circuitry will have to accommodate the bias variations. If this not designed correctly, it could end up consuming a lot of power. In an example, the device has an integrated system-on-chip device having a capability selectively adjust each optical modulator to accommodate for fabrication tolerances, wavelength operation, and/or extinction ratio, among other parameters. The device has a single silicon substrate member and a data input/output interface provided on the silicon substrate member and configured for a predefined data rate and protocol. In an example, the device has an input/output block provided on the silicon substrate member and coupled to the data input/output interface. In an example, the input/output block comprises a SerDes block, a CDR block, a compensation block, and an equalizer block, among others. The device has a signal processing block provided on the silicon substrate member and coupled to the input/output block. The signal processing block is configured to the input/output block using a bi-direction bus in an intermediary protocol. The device has a driver module provided on the silicon substrate member and coupled to the signal processing block.

In an example, the driver module is coupled to the signal processing blocking using a uni-directional multi-lane bus. In an example, the device has a driver interface provided on the silicon substrate member and coupled to the driver module and configured to be coupled to a silicon photonics device. In an example, the driver interface is configured to transmit output data in either an amplitude modulation format or a combination of phase/amplitude modulation format or a phase modulation format. In an example, the device has a receiver module comprising a TIA block provided on the silicon substrate member and to be coupled to the silicon photonics device using predefined modulation format, and configured to the digital signal processing block to communicate information to the input output block for transmission through the data input/output interface. In an example, the device has a communication block provided on the silicon substrate member and operably coupled to the input/output block, the digital signal processing block, the driver block, and the receiver block, and among others. The device has a communication interface coupled to the communication block and a control block provided on the silicon substrate member and coupled to the communication block.

In an example, the device has a variable bias block configured with the control block. In an example, the variable bias block is configured to selectively tune each of a plurality of laser devices provided on the silicon photonics device to adjust for at least a wavelength of operation, a fabrication tolerance, and an extinction ratio. As shown is a plurality of driver blocks. Each of the driver blocks is coupled to a voltage rail, and is configured with a variable voltage device to selectively tune each of the laser devices. In an example, each of the laser devices can be configured with an optical modulator(s) such as electro-absorption modulators, electro-optical modulators, among others, which often couple to a direct current power or bias. In an example, the DC bias is a function of wavelength of operation and fabrication tolerances, among other factors. In an example, the present bias circuitry accommodates and/or corrects for any bias variations, while desirably controlling power. Of course, there can be variations, modifications, and alternatives.

Figure 14:
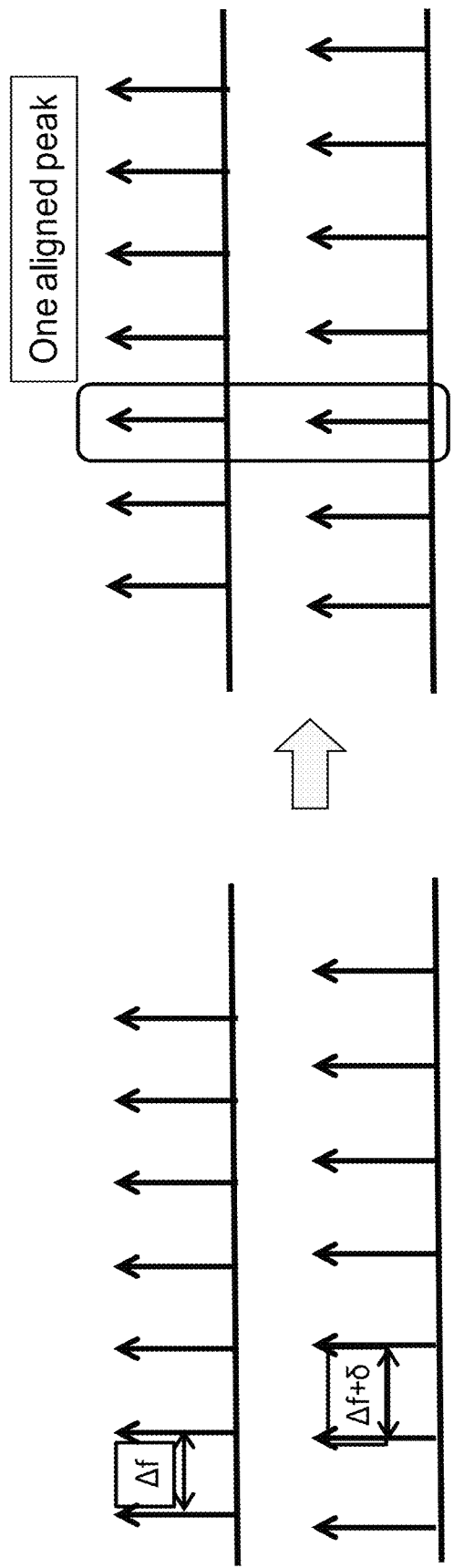
FIG. 14 is a simplified diagram illustrating wavelength tuning configured to silicon photonic device according to an embodiment of the present invention.

FIG. 14 is a simplified diagram illustrating wavelength tuning configured to silicon photonic device according to an embodiment of the present invention. In an example, the present tunable laser uses a set of rings with resonant frequencies that a slightly different. In an example, the technique uses a Vernier effect to tune the laser over a wide frequency range—limited by the bandwidth of the gain region. In an example, the Vernier desirably would be held in lock with respect to one another with a frequency difference Δf. In an example, the technique uses a dither frequency on one of the biases (e.g., heater) and lock the ring to the maximum transmission of the second ring, although there can be variations. As shown, resonant combs are generally misaligned, Δf+δ, in an example. When thermally tuned, techniques can be used to selectively align one of the combs to another comb or spatial reference. In an example, to maintain alignment, the technique dithers the signal to one of the rings to do maximum search. Of course, there can be variations, alternatives, and modifications.

Figure 15:
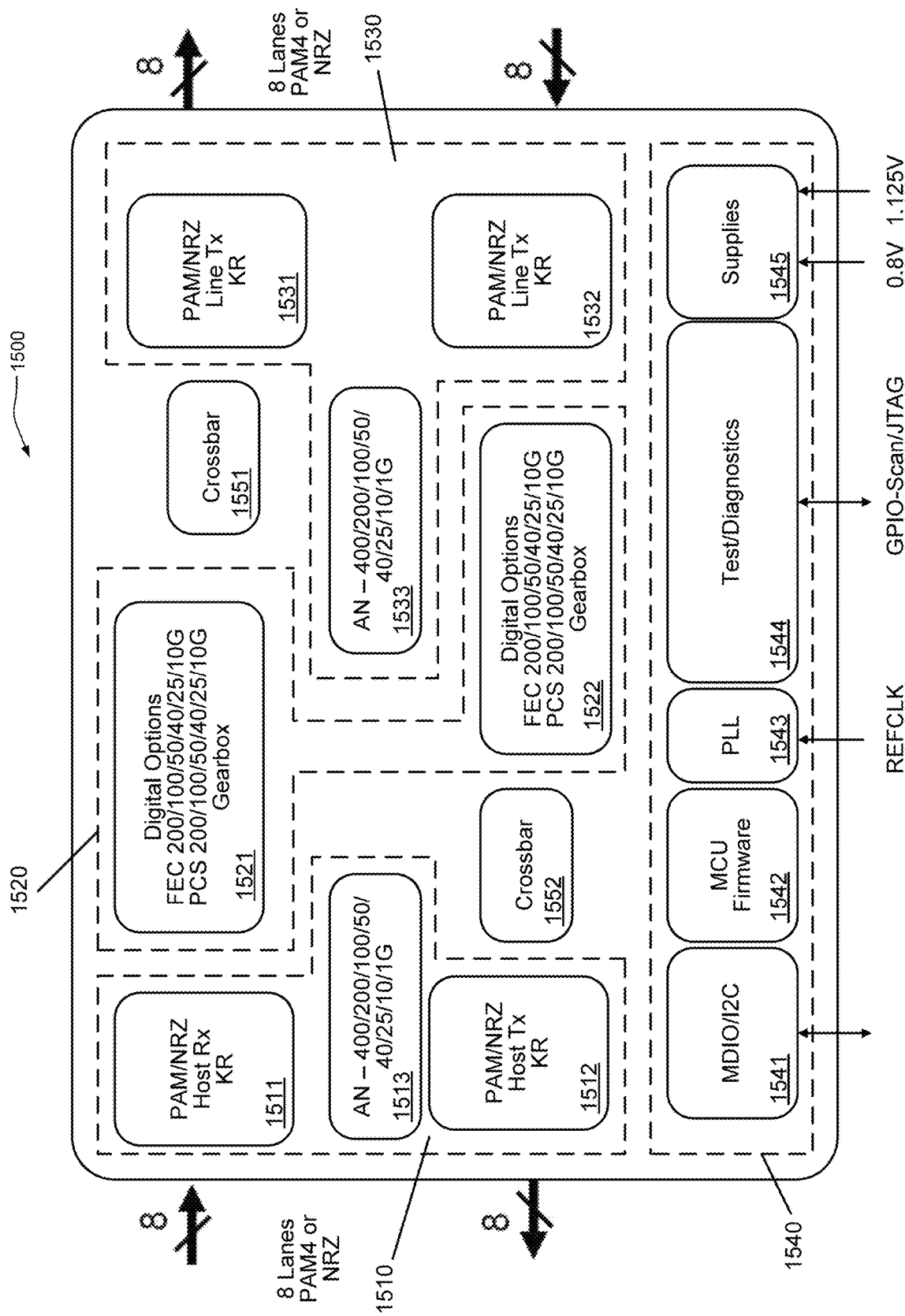
FIG. 15 is a simplified block diagram of an integrated single-chip control device for communicating with a silicon photonics device in a network system according to an embodiment of the present invention.

FIG. 15 is a simplified block diagram of a single-chip control device for communicating with a silicon photonics device for very short range Backplane Ethernet, having a separate TX module and an RX module according to an embodiment of the present invention. This diagram is merely an example, which should not unduly limit the scope of the claims. One of ordinary skill in the art would recognize many variations, alternatives, and modifications. As shown, the present invention includes an integrated device, or simply called "device" hereafter, configured on a single silicon substrate member. The device has a data input/output interface provided on a silicon substrate member and configured for a predefined data rate and protocol. The device has an input/output block provided on the silicon substrate member and coupled to the data input/output interface. In an example, the input/output block comprises a SerDes block, a CDR block, a compensation block, and an equalizer block, among others. The device has a signal processing block also provided on the first silicon substrate member and coupled to the input/output block. In an example, the signal processing block is configured to couple with the input/output block using a bi-direction bus in an intermediary protocol. Additionally, the device has a driver module provided on the same silicon substrate member and coupled to the signal processing block on the silicon substrate member. In an example, the driver module is coupled to the signal processing block using a uni-directional multi-lane bus. In an example, the device has a driver interface coupled to the driver module and configured to be coupled to a silicon photonics device formed on a separate substrate member. In an example, the driver interface is configured to transmit output data in either an amplitude modulation format or a combination of phase/amplitude modulation format or a phase modulation format. Furthermore, the device has a receiver module comprising a TIA block provided on the same silicon substrate member and to be coupled to the silicon photonics device on the separate substrate member using predefined modulation format, and configured to couple with the signal processing block to communicate information to the input/output block for transmission through the data input/output interface. In an example, the device has a communication block provided on the silicon substrate member and operably coupled to the input/output block, the signal processing block, the driver module on the substrate member through PCB trances, and the receiver module on the silicon substrate member through alternative PCB trances, among others. The integrated device has a communication interface coupled to the communication block. In a specific embodiment, a control block is configured to externally couple with the integrated device to receive and send instruction(s) in a digital format to the communication block and is configured to receive and send signals in an analog format to communicate with the silicon photonics device. In another specific embodiment, the integrated device is a single-chip control device 1500.

Referring to FIG. 15, the single-chip control device 1500 includes an input/output block 1510 comprising a receiving block 1511, a transmitting block 1512, and a first auto-negotiation block 1513; a signal processing block 1520 comprising a first digital Gearbox block 1521 and a second digital Gearbox block 1522; a first Crossbar block 1551; a second Crossbar block 1552; and a transceiver block 1530 comprising a transmit block 1531, a receiver block 1532, and a second auto-negotiation block 1533. The receiving block 1511 is configured to receive data signals from a very-short-reach (VSR) network host for handling data in total 400 Gbps rate. The data signal may be digitally formatted up to 8 channels with a first data rate of 50 Gbps per lane in PAM-4 format or 25 Gbps per lane in NRZ format. Optionally, a data rate of 25 Gbps in NRZ format can be implemented. The digital data signals are sent to the first digital Gearbox block 1521. Optionally, the data signals are provided as a data stream or serials of data streams over time. The transmitting block 1512 is configured to receive digital signals from the second digital logic block 1522 based on incoming current signals from the receiver block 1532 converted from optical signals. The transmitting block 1512 generates corresponding analog voltage signals sent to the VSR host. The input/output block 1510 is configured to operate at 50 Gbps in PAM-4 format or optionally at 25 Gbps in NRZ format and supports 10-14 dB channel loss. The auto-negotiation block 1513 in the input/output block 1510 is configured to allow two devices at either end of a 400/200/100/50/40/25/10/1 Gbps link to advertise and negotiate the link operational mode, such as the speed of the link, clock source, and the duplex configuration of half or full duplex, to the highest common denominator. The input/output block 1510 is compatible with IEEE 802.3 KP4, KR4, and KR for chip-to-backplane short range or very short range connection.

The signal processing block 1520 is configured to process both the digital data signal from the receiving block 1511 to generate an output data for the driver module 1531 and process the electrical current signal converted from the optical signal by the receiver block 1532 to generate digital voltage signals for the transmitting block 1512. The first digital Gearbox block 1521 and the second digital Gearbox block 1522 comprise a SerDes block configured to convert data streams of N into data streams of M. Optionally, the first digital Gearbox block 1521 couples to the transmitter block 1531 via a first Crossbar block 1551 for driving optical signal transmission and the second digital Gearbox block 1522 couples to the transmitting block 1512 via a second Crossbar block 1552 for transmitting Ethernet signals. Referring to FIG. 15, each of the first Crossbar block 1551 and the second Crossbar block 1552 is an 8×8 Crossbar switch for easy routing the 8 Lanes optical/electrical signals. Optionally, the digital Gearbox block 1521 includes a M:1 mux device, M=2 or 4 or 8. Optionally, the second digital Gearbox block 1522 includes a 1:M demux device, M=2, or 4 or 8. Optionally, the signal processing block 1520 further comprises a FEC block, an equalizer block, a framing block, a protocol block, an auto-negotiation block, and a redundancy block, among others. Optionally, the FEC block is able to flexibly handle error insertion with variable rate of 200/100/50/40/25/10 Gb/s Ethernet speed including Auto-Negotiation (AN) sublayers to negotiate FEC ability. Optionally, the FEC error indication is made by indicating error through sync bits to the physical coding sublayer (PCS) layers with variable rate of 200/100/50/40/25/10 Gb/s. The digital signal processing block 1520 is configured to have digital data processing performance to support >30 dB in any equalizer selected from decision feedback equalizer (DFE), feed-forward equalizer (FFE), and continuous-time linear equalizer (CTLE). Optionally, the signal processing block 1520 is compatible for Drive Chip-to-Backplane copper connection, Optical connection, and Direct Attach Cable (DAC) connection.

Referring to FIG. 15, the transceiver block 1530 This interface is configured to operate at 400 Gbps in PAM-4 format and support 35 dB channel loss with enhanced performance. The driver module 1531 is configured to couple with the first digital Gearbox block 1521 to receive output data using a uni-directional multi-lane bus and further to couple with the silicon photonics device on the separate substrate through a driver interface configured to transmit the output data in an amplitude modulation format, e.g., a PAM-4 format. Optionally, the silicon photonics device is configured to use a modulator to modulate laser signals based on the output data in PAM-4 format and a second data rate, that is twice of the first data rate handled in the input/output block 1510, to generate an output transport data. Optionally, the output transport data are optical signals up to eight WDM wavelengths. The silicon photonics device is configured to transmit the WDM optical signals to the network via an optical fiber. Optionally, the single-chip control device 1500 on a first die is integrated with the silicon photonics device on a second die on a same substrate for forming a communication system-on-a-chip. Optionally, the driver interface associated with the driver module 1531 uses a KR physical link for backplane Ethernet connector to connect with the silicon photonics device in this system-on-a-chip. Optionally, the driver module 1531 is selected from a current driver in an example or a voltage driver in another example. In yet another example, the driver module 1531 is a differential driver or the like. The receiver module 1532 in the single-chip control device 1500 is configured to couple to the silicon photonics device in the system-on-a-chip to receive up to eight optical signals using predefined modulation format and convert the optical signals to electrical current signals. The receiver module 1532 further is configured to couple with the second digital Gearbox block 1522 to communicate data information to the transmitting block 1512 of the input/output block 1510 for transmission through the data input/output interface for its network host.

Referring to FIG. 15, the single-chip control device 1500 further includes a communication block 1540 comprising a communication interface 1541, a multi-point control firmware unit 1542, a phase lock loop (PLL) 1543. Optionally, the communication interface 1541 is a Management Data Input/Output (MDIO) interface. Optionally, the communication interface 1541 is an I$^2$C-type interface. The phase lock loop 1543 receives one or more reference clock inputs for controlling the signal input and output.

In some embodiments, the communication block 1540 further includes a test/diagnostics unit 1544 including a general purpose Input/Output port for communicating Host and Line Loopbacks, a Scan port for supporting boundary scan for Eye-Scan/Histograms, and a test access port with JTAG interface for pseudorandom binary sequence (PRBS) Gen/Checkers. In some embodiments, the communication block 1540 further includes a power supply module configured to receive power supplies of a 0.8 V port, 1.125 V port. Optionally, the test diagnostics unit 1544 is integrated in the same single-chip control device 1500 with the help of external software that is run over the MDIO or I$^2$C interface 1541.

Optionally in various applications, the single-chip control device 1500 coupled to the silicon photonics device for forming an integrated system-on-a-chip. Optionally, the silicon photonics device (e.g., a silicon photonics block 700) includes at least a laser device and a modulator driven by the driver module 1531 to modulate laser signals based on the data signals received from the first digital Gearbox block 1521. The modulator can be one selected from an electro absorption modulator (EAM) or electro optic modulator (EOM), or a Mach-Zehnder modulator (MZM). Optionally, the laser signals are modulated with an amplified modulation format selected from a NRZ format or a PAM format.

Optionally, the PAM format is a PAM-4 format. Additionally, the silicon photonics device includes at least an optical mux/demux device coupled with optical fibers to send/receive WDM optical signals into/from the network. Optionally, the optical mux/demux device is also based on silicon. Furthermore, the silicon photonics device includes at least a photo detector configured to convert the WDM optical signals received from the network into current signals.

In an alternative aspect, a network system is provided to integrate a single-chip opto-electrical control device coupled with a silicon photonics device for receiving optical signals from a fiber-based communication network and converting the optical signals to electrical signals in digital format to be sent to a copper-based communication network, and for receiving electric data signals of first data rate from host and generating driving control signals to the silicon photonics device to modulate lasers based on the data signals to generate WDM optical signals with a second data rate twice larger than the first data rate for communicating in the fiber-based communication network. Optionally, the network system is formed as an integrated system-on-a-chip device with the single-chip control device 1500 in a first die coupled with the silicon photonics device in a second die. Optionally, an external control block is coupled to the single-chip control device 1500 via the driver module 1531 for sending the driving control signals to the silicon photonics device to control the laser module therein and receive feedback signals from the silicon photonics device. Optionally, the control block is also integrated together in the system-on-a-chip device. In an example, the silicon photonics device is configured to convert the output data from the single-chip control device into an output transport data in a WDM optical signal. In an example, the control block is configured to initiate a laser bias or a modulator bias as control signals. In an example, the control block is configured for laser bias control and power control of the silicon photonics device sent through the driver module 1531 via PCB trances. In an example, the control block is configured with a thermal tuning or carrier tuning device each of which is configured on the silicon photonics device.

Figure 16:
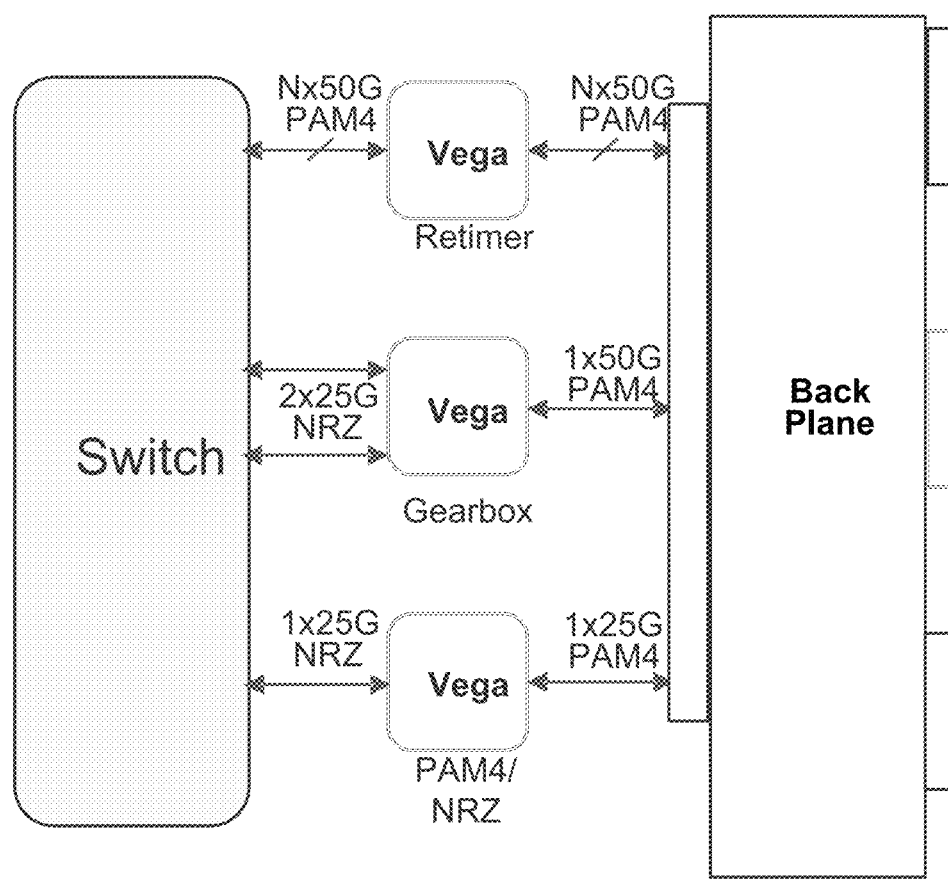
FIG. 16 is an example of applying the single-chip control device (Vega) of FIG. 15 in the backplane connection of a network system according to an embodiment of the present invention.

FIG. 16 is an example of applying the single-chip control device (Vega) of FIG. 15 in a Backplane connection of a network system according to an embodiment of the present invention. This diagram is merely an example, which should not unduly limit the scope of the claims. One of ordinary skill in the art would recognize many variations, alternatives, and modifications. As shown, the single-chip control device, referred as 'Vega' and shown in FIG. 15, is disposed between a switch and Back Plane via a KR physical link. Optionally, the single-chip control device is configured to be an Ethernet retimer featured with N-channel 50 G rate in PAM-4 modulation format (N is up to 8) in both input end via the switch and output end coupled to the Back Plane for handling integrated signal conditioning in crosstalk-impaired high-speed serial links. Optionally, the switch may be configured to couple with, through one or more communication network modules, a host photonics module having at least a laser device, a modulator, a photo detector, and an optical mux/demux device. The Vega single-chip control device may be provided in a separate die with respect to the host photonics module. Optionally, the switch is coupled directly to a host electric module. Alternatively, the Vega single-chip control device is configured to be an Ethernet gearbox with a logic responsible for translating every two channels of data signals from the PCS with 25 G in NRZ format into one channel data signal of 50 G in PAM-4 format to the Back Plane or vice versa. In another option, the Vega single-chip control device is simply a transceiver for transmitting/receiving at least one 25 G data signal in NRZ format to/from the Back Plane with at least one 25 G data signal in PAM-4 format or vice versa.

In another aspect, the present invention provides a system and method used in secure transactions for transferring and configuring peer-to-peer transactions. Such peer-to-peer transactions can be used in a variety of applications such as digital currency transaction. A digital currency, e.g., a bitcoin used in Bitcoin, is computationally brought into existence by an issuer (e.g., a bitcoin is "mined"). Bitcoin is described in particular at www.bitcoin.com. In an embodiment, digital currency can be stored in a system of the present disclosure including a virtual cryptographic wallet, (hereinafter "wallet"), i.e., a software and/or hardware technology to store cryptographic keys and cryptographic currency. For example, digital currency can be purchased (e.g., for U.S. dollars at an ATM or at an exchange), sold (e.g., for goods and/or services), traded, or exchanged for a different currency or cryptographic currency through the system for transferring and configuring peer-to-peer transactions. A sender makes a payment (or otherwise transfers ownership) of digital currency by broadcasting (e.g., in packets or other data structures) a transaction message to nodes on a peer-to-peer network. The transaction message includes the quantity of virtual currency changing ownership (e.g., 4 bitcoins) and the receiver's (i.e., the new owner's) public key-based address. Transaction messages are sent through the Internet, without the need to trust a third party, so settlements are extremely timely and efficient.

Depending upon different embodiments, one or more of the applications can be included, among others. Other types of crypto currencies include, among others, Ethereum, Ripple, Litecoin, Dash: Digital+ cash, NEM, Ethereum Classic, Monero, and Zcash. Further details of these applications can be found throughout the present specification and more particularly below.

In an embodiment, crypto currencies like bitcoins are virtual entities that are traded on the Internet or worldwide network of computers. The internet infrastructure over which these transactions occur are public cloud based. Although the currencies themselves may be protected by a combination of private and public keys, the infrastructure, by the design of the public ledger system used by these currencies is an open system.

Figure 17:
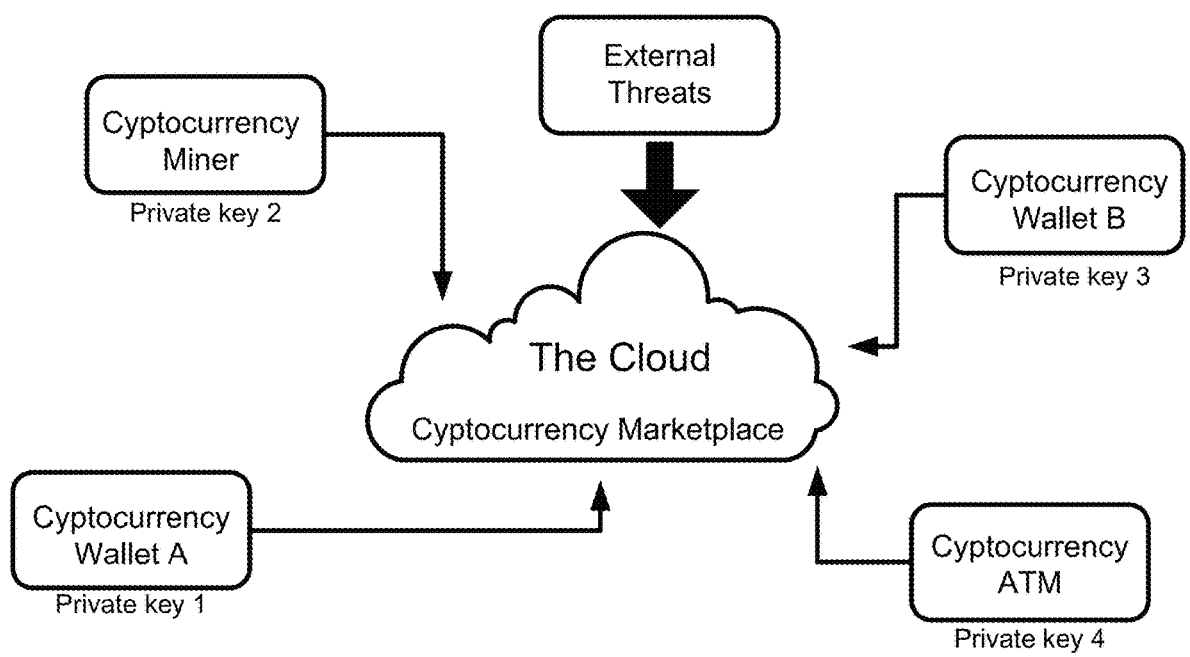
FIG. 17 is a simplified diagram illustrating a cryptocurrency system for communicating settlement transactions according to an embodiment of the present invention.

FIG. 17 is a simplified diagram illustrating a cryptocurrency system for communicating settlement transactions according to an embodiment of the present invention. As shown, the system has a network or cloud based market place, a cryptocurrency miner, a cryptocurrency wallet A, a cryptocurrency wallet B, a cryptocurrency ATM (i.e., automated teller machine), and an external threat which is present to threaten the transaction, wallet, or user information. Referring to FIG. 17, there are several three major groups of entities operating in the cryptocurrency marketplace that implementing the system. One group of entities is miners that "create" these cryptocurrencies following a strictly defined computational protocol. A next group of entities is ATM's where the cryptocurrencies may be purchased or exchanged for "real" world currencies and pretty much serve the functions of a real ATM. Another group of entities is wallets where the currencies are usually stored. Optionally, the wallets exist at the miners. Optionally, the wallets exist at the ATM's. Of course, there can be other variations, modifications, and alternatives.

Optionally, the cryptocurrency system has a public ledger that allows for trusted peer to peer transactions. In an example, the elements or entities communicate in a peer-to-peer basis without an intermediary, while the transactions are recorded in the public ledger. However, the very nature of the existing open public ledger associated with crypto currencies transaction management is that it is built with a shallow layer of protocol based on electrical signal encryptions and communications, making it vulnerable to external threats, and to those who with malicious intents.

Figure 18:
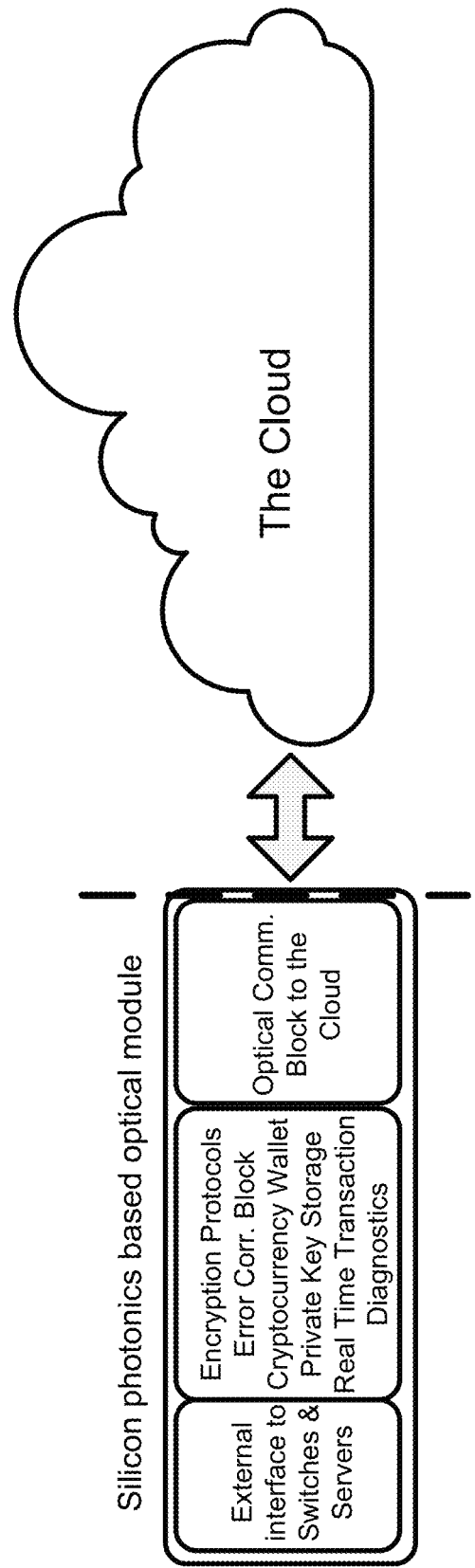
FIG. 18 is a schematic diagram illustrating system and method including a Silicon Photonics based optical module for communicating peer-to-peer transaction according to an embodiment of the present invention.

FIG. 18 is a schematic diagram illustrating system and method including a Silicon Photonics based optical module for communicating peer-to-peer transaction according to an embodiment of the present invention. Referring to FIG. 17 and FIG. 18, one or more or all those entities representing Miners, ATM's, and Wallets and others like regulatory bodies in the cryptocurrency system are configured to conduct the various transactions over the public cloud infrastructure.

Although in general, there are several layers of security protocols in the networks for peer to peer transaction, in an example, the present invention provides an improved and more secured layer of encryption protocol of using a Silicon Photonics based optical module for storing private key of cryptocurrency Wallet as well as related methods of performing real-time transaction with error correction functions. In an example, the optical module is configured via a plug or other interface, which are almost all composed of optical inter and intra network connections, to connect it into the network to become a key component in the secure peer to peer transactions.

In an embodiment, referring to FIG. 18, the present system and method includes a Silicon photonics based optical module as shown. The optical module includes a substrate member and a memory resource formed on the substrate member. Optionally, the substrate member includes a silicon-on-insulator (SOA) substrate. The memory resource includes a computer-readable storage device. Additionally, the optical module includes a cryptocurrency wallet provided on the memory resource. The optical module further includes an optical communication block with a direct-to cloud interface. Furthermore, the optical module includes an application block to enable a cryptocurrency transaction via the direct-to-cloud interface. Moreover, the optical module includes an external interface connecting the application block to a physical layer.

In an example, the optical module is configured to an optical network portion of the network, i.e., as one of entities shown in FIG. 17 that is virtually connected to the cloud. The optical module includes an external interface (e.g., a user interface) to establish a link to a user/host via one or more physical layers including servers and/or one or more switches or routers to receive incoming electrical signals. Optionally, the incoming electrical signals include orders of executing a transaction of cryptocurrency. Optionally, the link is a secured link for executing a cryptocurrency transaction. Additionally, the optical module includes an application block coupled to the memory resource to verify information about digital currency in the cryptocurrency wallet and private key storage provided on the memory resource. Optionally, the application block is configured to initiate any transaction including purchase (of using U.S. dollars at an ATM or at an exchange), sold (e.g., for goods and/or services), trade or exchange the (verified) digital currency for a different currency or cryptographic currency. In an example, the optical module is implemented in an entity as a sender who issues an order of making a payment (or otherwise transfers ownership) of the digital currency in the current cryptocurrency wallet thereof. The transaction is to be executed by broadcasting (e.g., in terms of digital packets or other data structures) a transaction message to other entities in the cloud via a peer-to-peer network transaction. Optionally, the transaction message includes the quantity of virtual currency changing ownership and the receiver's public key-based address. Optionally, as shown in FIG. 8, the application block is part of a single chip module including at least a digital signal processor (DSP) configured to analyze the incoming electrical signals. These signals include the transaction message about orders of executing a transaction of cryptocurrency. Then the application block may include a controller to generate modulation/driving signals based on the incoming electrical signal carrying this transaction message. Optionally, as shown in FIG. 15, the application block is part of a single-chip control device 1500.

Furthermore, the optical module includes an optical communication block to communicate with other entities in the cloud via a direct-to-cloud interface. Firstly, as an optical module implemented at a sender entity, the optical communication block includes at least an optical transmitter to be driven by the modulation/driving signal sent from the application block to generate an optical signal based on encryption protocols predefined for the cryptocurrency transaction. Optionally, the optical communication block includes one or more internal encryption units to encode the transactions optically (encryption included in the transaction envelope) so that only the intended user can read the envelope. Optionally, the encryption protocol may be a hardware level encryption protocol where the intruder physically needs to break into the encryption unit hardware at both sender and receiver ends to decode the envelope. The optical transmitter outputs the optical signal carrying the encrypted transaction envelope to one of other entities in the cloud via the direct-to-cloud (market) interface. Optionally, the optical module is configured as a portable device/token that interfaces directly with a switch, router or otherwise an appliance in the cloud infrastructure. It will establish a link between the parties in the transaction to allow the optical signal to be transmitted through before the transaction is communicated. Optionally, the link across the network/cloud with the party or parties that is/are part of the transaction is through internet. Optionally, the transaction is executed through a peer-to-peer network transmission without the need to trust a third party. Optionally, the link needs not be a point to point protocol. Multi party protocols are also considered here.

In an example, the optical communication block can serve multiple purposes including, among others, processing and/or switching optical signals (at some are generated for executing cryptocurrency transactions). Optionally, the optical communication block is based on Silicon photonics technology that integrates all optical components including at least some of the following: laser, modulator, isolator, circulator, optical multiplexer and de-multiplexer devices, photo-detector, dispersion compensator, polarization rotator/splitter, and others on a substrate member. Optionally, all these optical components are optimized for cryptocurrency transactions. In the example of the optical module implemented in a transmitting entity (e.g., a Miner or a cryptocurrency seller), it is served as a transmitter unit for sending transaction message through out-going optical signals via a peer-to-peer network. Alternatively, the optical module also can be implemented in a receiving entity (e.g., a cryptocurrency buyer) including a receiver unit for converting the incoming optical signals carrying the transaction message to an incoming electrical signal. A DSP in this optical module is configured to analyze the incoming electrical signal to decrypt the transaction envelope. After the envelope has been decrypted, the transaction can be decrypted using the private/public key protocols stored in the memory resource of this optical module. The DSP also may generate a feedback signal carrying information of confirming the receiver's public key-based address or others related to the cryptocurrency transaction. Further, the optical module may include a forward-error correction (FEC) block coupled to the application block to process the incoming electrical signal to generate any error-correction signal including bit-error rate (BER). Optionally, the BER detected by the FEC block is used for signal diagnostics. Optionally, the error-correction signal may be related to the proposed cryptocurrency transaction. Furthermore, the optical module includes a controller configured to generate back-channel data based on results from the DSP and the FEC block and be sent the back-channel data via a back-channel back to the optical module at the transmitting entity.

In an embodiment, the Silicon photonics based optical module designed for conducting cryptocurrency transaction includes an intelligent, portable cryptocurrency interface to the cryptocurrency marketplace. This interface is comprised of a user interface and a market interface. Additionally, the optical module includes internal encryption blocks to further encode the transactions optically. Optionally, the encryption is included in a transaction envelope so that only the intended user can read the envelope. After the envelope has been decrypted, the transaction can be decrypted using the private/public key protocols. Optionally, the encryption includes a hardware level encryption protocol where the intruder physically needs to break into the encryption hardware at both ends to decode the envelope. This, of course, provides doubled security for the cryptocurrency transaction.

In an embodiment, the internal encryption block is configured to provide optical Quantum Key Generation and Distribution. This is the level of encryption that is provided in the optical module of the present disclosure for secure cryptocurrency transactions. Note, the optical Quantum Key Generation (QKG) encryption protocol is not part of the private key/public key protocol for the cryptocurrency, and pertains only to the security of the cryptocurrency transaction. In a specific embodiment, these QKG encryption protocols are implemented in continuous-variable quantum key distribution (CV-QKD) systems. In an example, they are like coherent communication systems with a local oscillator for a strict phase reference, and the data is transmitted in the quadrature phases of the optical signal. Intruders need to tamper with the local oscillator to break the code. Optionally, another encryption protocol implemented in the discrete-variable quantum key distribution (DV-QKD) system is employed with a highly attenuated optical signal in application for pluggable coherent communication, approaching the particle nature of light for encryption.

In an embodiment, the optical module is configured to be a portable device/token/pluggable-module that interfaces directly with a switch, a router, or otherwise an appliance in the cloud infrastructure. Each optical module represents each party (a Miner, or a Wallet, or an ATM) connected to the cloud infrastructure. It will establish a link between the parties in the peer-to-peer transaction before the transaction is communicated. To establish such an interface, the device first needs to establish a secure link with the user/host side. It then establishes the link across the network/cloud with the party or parties that is/are part of the transaction. This needs not be a point to point protocol. Multi party protocols are also considered here. The same optical module also holds the Wallet (and the currency) so that it enables the multi-party transaction once the link is established. Then, the optical module may be detached from the host after any transaction and becomes in-accessible to the potential network threat.

In another embodiment, the Silicon photonics based optical module comprises a size envisioned to be that of a pluggable module commonly used for switch and router interfaces, e.g., QSFP, SFF, OSFP, CFP, etc. This is going to be implemented in the optical module product pluggable for coherent communication with even higher security for the cryptocurrency transaction.

While the above is a full description of the specific embodiments, various modifications, alternative constructions and equivalents may be used. Therefore, the above description and illustrations should not be taken as limiting the scope of the present invention which is defined by the appended claims.

What is claimed is:

1. An optical module configured to control a peer-to-peer transaction, the optical module comprising:
a silicon photonics substrate;
memory formed on the silicon photonics substrate and configured to store a private key;
application circuitry formed on the silicon photonics substrate and coupled to the memory, the application circuitry configured to (i) receive, via an external interface, an electrical signal carrying instructions for executing a digital financial transaction, (ii) verify the digital financial transaction using the private key stored in the memory, and (iii) selectively generate a transaction message including information for completing the digital financial transaction; and
optical communication circuitry formed on the silicon photonics substrate comprises a direct-to-cloud interface and responsive to the application circuitry, the optical communication circuitry configured to (i) generate an optical signal based on the transaction message, (ii) generate a strict phase reference for the optical signal using a local oscillator, and (iii) transmit the optical signal via the direct-to-cloud interface to at least one remote entity securely based on the strict phase reference generated using the local oscillator.

2. The optical module of claim 1, wherein the memory is configured as a wallet for virtual currency.

3. The optical module of claim 2, wherein the virtual currency is a cryptocurrency.

4. The optical module of claim 1, wherein the silicon photonics substrate includes a silicon-on-insulator substrate.

5. The optical module of claim 1, further comprising the external interface, the external interface being configured to establish a link between the application circuitry and a physical layer to receive the electrical signal from either of a host device or a user device via the physical layer.

6. The optical module of claim 1, wherein the application circuitry is configured to verify the digital financial transaction based on an amount of virtual currency stored in the memory.

7. The optical module of claim 1, wherein the optical communication circuitry is configured to optically encrypt information about the digital financial transaction into the optical signal.

8. The optical module of claim 7, wherein the optical communication circuitry includes an internal encryption circuitry configured to encrypt the optical signal.

9. The optical module of claim 8, wherein the internal encryption circuitry is configured to encrypt the optical signal in quadrature phases using an optical Quantum Key Generation encryption protocol.

10. The optical module of claim 8, wherein the internal encryption circuitry is configured to encrypt the optical signal in accordance with a hardware level encryption protocol.

11. The optical module of claim 1, further comprising transmitter circuitry configured to transmit the optical signal in accordance with a drive signal.

12. The optical module of claim 11, wherein the transmitter circuitry is configured to transmit the optical signal through a link to a network entity, the network entity being configured to execute the peer-to-peer transaction using a public key stored in a second optical module located in the network entity.

13. A portable device comprising the optical module of claim 1, the portable device having a pluggable form factor.

14. The portable device of claim 13, wherein the pluggable form factor is one of a quad small form factor pluggable (QSFP) form factor, a small form factor (SFF), an octal small for factor pluggable (OSFP) form factor, and a C form factor pluggable (CFP) form factor.

* * * * *